US010234561B2

United States Patent
Godbaz et al.

(10) Patent No.: US 10,234,561 B2
(45) Date of Patent: Mar. 19, 2019

(54) SPECULAR REFLECTION REMOVAL IN TIME-OF-FLIGHT CAMERA APPARATUS

(71) Applicant: Microsoft Technology Licensing, LLC, Redmond, WA (US)

(72) Inventors: John Peter Godbaz, Mountain View, CA (US); Cyrus S. Bamji, Fremont, CA (US); Mirko Schmidt, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 15/150,291

(22) Filed: May 9, 2016

(65) Prior Publication Data

US 2017/0322309 A1  Nov. 9, 2017

Related U.S. Application Data

(60) Provisional application No. 62/333,656, filed on May 9, 2016.

(51) Int. Cl.
*G01S 17/89* (2006.01)
*H04N 13/254* (2018.01)
(Continued)

(52) U.S. Cl.
CPC ............ *G01S 17/89* (2013.01); *G01S 7/4814* (2013.01); *G01S 7/493* (2013.01); *G01S 17/08* (2013.01);
(Continued)

(58) Field of Classification Search
CPC ........... G01S 17/89; G01S 17/06; G01S 7/484
See application file for complete search history.

(56) References Cited

U.S. PATENT DOCUMENTS 4,965,442 A   10/1990   Girod et al.
5,434,612 A    7/1995   Nettleton et al.
(Continued)

FOREIGN PATENT DOCUMENTS

EP   0176339       4/1986
EP   2955544 A1  12/2015
(Continued)

OTHER PUBLICATIONS

Nayar et al, "Fast separation of direct and global components of a scene using high frequency illumination", ACM Transactions on Graphics (TOG) TOG Homepage vol. 25 Issue 3, Jul. 2006 Issue-in-Progress pp. 935-944 (Year: 2006).*

(Continued)

*Primary Examiner* — Luke D Ratcliffe
(74) *Attorney, Agent, or Firm* — Workman Nydegger

(57) ABSTRACT

A method for facilitating removal of specular reflection noise from light data can include illuminating, using an illumination unit, a target with a light source. The illumination unit is configured to project light with a spatial light pattern onto the target. The method can also include acquiring, with a sensor unit, light data that is reflected from the target. The light data may comprise a directly reflected spatial light pattern and a specular reflected spatial light pattern. The directly reflected spatial light pattern and the specular reflected spatial light pattern comprise at least one spatial distinction that distinguishes the directly reflected spatial light pattern from the specular reflected spatial light pattern. The method can further comprise processing the light data to distinguish the directly reflected spatial light pattern from the specular reflected spatial light pattern based upon the at least one spatial distinction.

20 Claims, 12 Drawing Sheets

(51) Int. Cl.
| | |
|---|---|
| H04N 5/217 | (2011.01) |
| G01S 17/08 | (2006.01) |
| G01S 17/50 | (2006.01) |
| G06T 5/00 | (2006.01) |
| G06T 5/20 | (2006.01) |
| G01S 7/481 | (2006.01) |
| G01S 7/493 | (2006.01) |
| H04N 13/122 | (2018.01) |
| G06T 19/00 | (2011.01) |

(52) U.S. Cl.
CPC .............. *G01S 17/50* (2013.01); *G06T 5/002* (2013.01); *G06T 5/20* (2013.01); *H04N 5/2173* (2013.01); *H04N 13/122* (2018.05); *H04N 13/254* (2018.05); *G06T 19/006* (2013.01); *G06T 2207/10028* (2013.01); *G06T 2207/20024* (2013.01); *G06T 2207/20192* (2013.01)

(56) References Cited

U.S. PATENT DOCUMENTS

| | | | |
|---|---|---|---|
| 5,878,152 | A | 3/1999 | Sussman |
| 6,219,461 | B1 | 4/2001 | Wallack |
| 6,229,913 | B1 | 5/2001 | Nayar et al. |
| 6,269,197 | B1 | 7/2001 | Wallack |
| 6,503,195 | B1 | 1/2003 | Keller et al. |
| 7,236,256 | B2 | 6/2007 | Yamaguchi |
| 7,710,391 | B2 | 5/2010 | Bell et al. |
| 8,187,097 | B1 | 5/2012 | Zhang |
| 8,330,822 | B2 | 12/2012 | McEldowney et al. |
| 8,334,893 | B2 | 12/2012 | Hartman |
| 8,736,818 | B2 | 5/2014 | Weimer et al. |
| 2001/0048519 | A1 | 12/2001 | Bamji et al. |
| 2002/0028010 | A1 | 3/2002 | Toida |
| 2003/0025917 | A1 | 2/2003 | Suhami |
| 2004/0023612 | A1 | 2/2004 | Kriesel |
| 2004/0213463 | A1 | 10/2004 | Morrison |
| 2007/0091175 | A1 | 4/2007 | Iddan et al. |
| 2010/0026850 | A1 | 2/2010 | Katz |
| 2010/0258708 | A1 | 10/2010 | Meyers et al. |
| 2011/0164783 | A1 | 7/2011 | Hays et al. |
| 2011/0228251 | A1 | 9/2011 | Yee et al. |
| 2012/0033045 | A1 | 2/2012 | Schweizer et al. |
| 2012/0075534 | A1 | 3/2012 | Katz et al. |
| 2012/0081360 | A1 | 4/2012 | Uehira et al. |
| 2012/0112093 | A1* | 5/2012 | Rosen ................ G01J 1/0429 250/458.1 |
| 2012/0154573 | A1 | 6/2012 | Cohen |
| 2012/0182392 | A1 | 7/2012 | Kearns et al. |
| 2012/0261516 | A1 | 10/2012 | Gilliland et al. |
| 2012/0274921 | A1 | 11/2012 | Lai |
| 2012/0287242 | A1 | 11/2012 | Gilboa et al. |
| 2013/0314694 | A1 | 11/2013 | Tchoryk et al. |
| 2014/0104481 | A1 | 4/2014 | Spears |
| 2014/0293265 | A1 | 10/2014 | Stettner et al. |
| 2014/0333917 | A1 | 11/2014 | Payne et al. |
| 2014/0340569 | A1 | 11/2014 | Raskar et al. |
| 2014/0347443 | A1 | 11/2014 | Cohen et al. |
| 2015/0062558 | A1 | 3/2015 | Koppal et al. |
| 2015/0131080 | A1 | 5/2015 | Retterath et al. |
| 2015/0241564 | A1 | 8/2015 | Takano |
| 2015/0253429 | A1* | 9/2015 | Dorrington ............. G01S 17/89 356/5.01 |
| 2015/0281671 | A1 | 10/2015 | Bloom et al. |
| 2015/0286340 | A1 | 10/2015 | Send et al. |
| 2015/0292876 | A1 | 10/2015 | Petterson et al. |
| 2015/0301177 | A1 | 10/2015 | Tsukamoto et al. |
| 2015/0319347 | A1 | 11/2015 | Cottrell |
| 2015/0323311 | A1 | 11/2015 | Muijs et al. |
| 2016/0018526 | A1 | 1/2016 | Van Den Bossche et al. |
| 2016/0019684 | A1 | 1/2016 | Hudman |
| 2016/0041264 | A1 | 2/2016 | Dielacher et al. |

FOREIGN PATENT DOCUMENTS

| | | |
|---|---|---|
| WO | 2013108031 | 7/2013 |
| WO | 2013120041 | 8/2013 |
| WO | 2015041687 | 3/2015 |

OTHER PUBLICATIONS

"International Search Report and Written Opinion issued in PCT Appiication No. PCT/US2017/030704", dated Sep. 27, 2017, 13 Pages.

U.S. Appl. No. 15/150,303, filed May 9, 2016, Godbaz et al.

U.S. Appl. No. 15/150,321, filed May 9, 2016, Godbaz et al.

Achar, et al., "Compensating for Motion during Direct-Global Separation", In Proceedings of IEEE International Conference on Computer Vision, Dec. 1, 2013, pp. 1481-1488.

"Analysis and Elimination of Multi-Path Interference in AMCW Lidar Systems Using Trigonometric Moments", Published on: Feb. 19, 2016 Available at: http://www.grk1564.uni-siegen.de/en/analysis-and-elimination-multi-path-interference-amcw-lidar-systems-using-trigonometric-moments.

Antonio, et al., "Constructive interference for Multi-view Time-of-Flight acquisition", In Doctoral dissertation, Technical University of Munich, Retrieved on: Mar. 8, 2016, 155 pages.

Bhandari, et al., "Resolving Multipath Interference in Kinect: An Inverse Problem Approach", In Journal of IEEE Sensors, vol. 16, Issue 10, Apr. 8, 2015, 4 pages.

Bhandari, et al., "Resolving Multi-path Interference in Time-of-Flight Imaging via Modulation Frequency Diversity and Sparse Regularization", In Journal of Optics Letters, vol. 39, Issue 6, Apr. 2014, pp. 1-11.

Freedman, et al., "SRA: Fast Removal of General Multipath for ToF Sensors", In Journal of Computing Research Repository, Mar. 2014, pp. 1-15.

Fuchs, Stefan., "Multipath Interference Compensation in Time-of-Flight Camera Images", In Proceedings of 20th International Conference on Pattern Recognition, Aug. 23, 2010, pp. 3583-3586.

Guan, et al., "Composite structured light pattern for three-dimensional video", In Journal of Optics Express, vol. 11, No. 5, Mar. 10, 2003, pp. 406-417.

Jimenez, et al., "Modelling and correction of multipath interference in time of flight cameras", In Proceedings of IEEE Conference on Computer Vision and Pattern Recognition, Jun. 16, 2012, pp. 893-900.

Kadambi, et al., "Coded Time of Flight Cameras: Sparse Deconvolution to Address Multipath Interference and Recover Time Profiles", In Journal ACM Transactions on Graphics, vol. 32, Issue 6, Nov. 2013, 10 pages.

Kirmani, et al., "SPUMIC: Simultaneous phase unwrapping and multipath interference cancellation in time-of-flight cameras using spectral methods", In Proceedings of IEEE International Conference on Multimedia and Expo, Jul. 15, 2013, 6 pages.

Li, Larry, "Time-of-Flight Camera—An Introduction", In Technical White Paper of Texas Instruments, Jan. 2014, 10 pages.

Naik, et al., "A Light Transport Model for Mitigating Multipath Interference in Time-of-flight Sensors", In Proceedings of IEEE Conference on Computer Vision and Pattern Recognition, Jun. 7, 2015, 1 page.

Naik, et al., "A Light Transport Model for Mitigating Multipath Interference in Time-of-flight Sensors", In Proceedings of IEEE Conference on Computer Vision and Pattern Recognition, Jun. 7, 2015, 9 pages.

Nayar, et al., "Fast Separation of Direct and Global Components of a Scene using High Frequency Illumination", In Journal of ACM Transactions on Graphics (TOG), vol. 25, Issue 3, Jul. 2006, 10 pages.

Schuon, et al., "High-Quality Scanning Using Time-Of-Flight Depth Superresolution", In Proceedings of IEEE Computer Society Conference on Computer Vision and Pattern Recognition Workshops, Jun. 23, 2008, 7 pages.

(56) References Cited

OTHER PUBLICATIONS

Shim, et al., "Hybrid exposure for depth imaging of a time-of-flight depth sensor", In Journal of Optics Express, vol. 22, Issue 11, May 19, 2014, pp. 13393-133402.

Son, et al., "Learning to Remove Multipath Distortions in Time-of-Flight Range Images for a Robotic Arm Setup", In Journal of Computer Vision and Pattern Recognition, Jan. 2016, 8 pages.

Velten, et al., "Recovering three-dimensional shape around a corner using ultrafast time-of-flight imaging", In Journal of Nature Communications vol. 3, Article No. 745, Mar. 20, 2012, pp. 1-8.

Whyte, et al., "Resolving multiple propagation paths in time of flight range cameras using direct and global separation methods", In Journal of Optical Engineering, vol. 54, Issue 11, Nov. 24, 2015, 10 pages.

Zeman, et al., "Constructive interference for Multi-view Time-of-Flight acquisition", In Doctoral dissertation, Technical University of Munich, Mar. 9, 2016, 155 pages.

"International Search Report and the Written Opinion issued in PCT Application No. PCT/US2017/031467 dated Aug. 10, 2017."

"International Search Report and the Written Opinion issued in PCT Application No. PCT/US2017/030705 dated Sep. 26, 2017."

"Non Final Office Action Issued in U.S. Appl. No. 15/150,303", dated Aug. 13, 2018, 13 Pages.

"Non Final Office Action Issued in U.S. Appl. No. 15/150,321", dated Aug. 14, 2018, 15 Pages.

\* cited by examiner

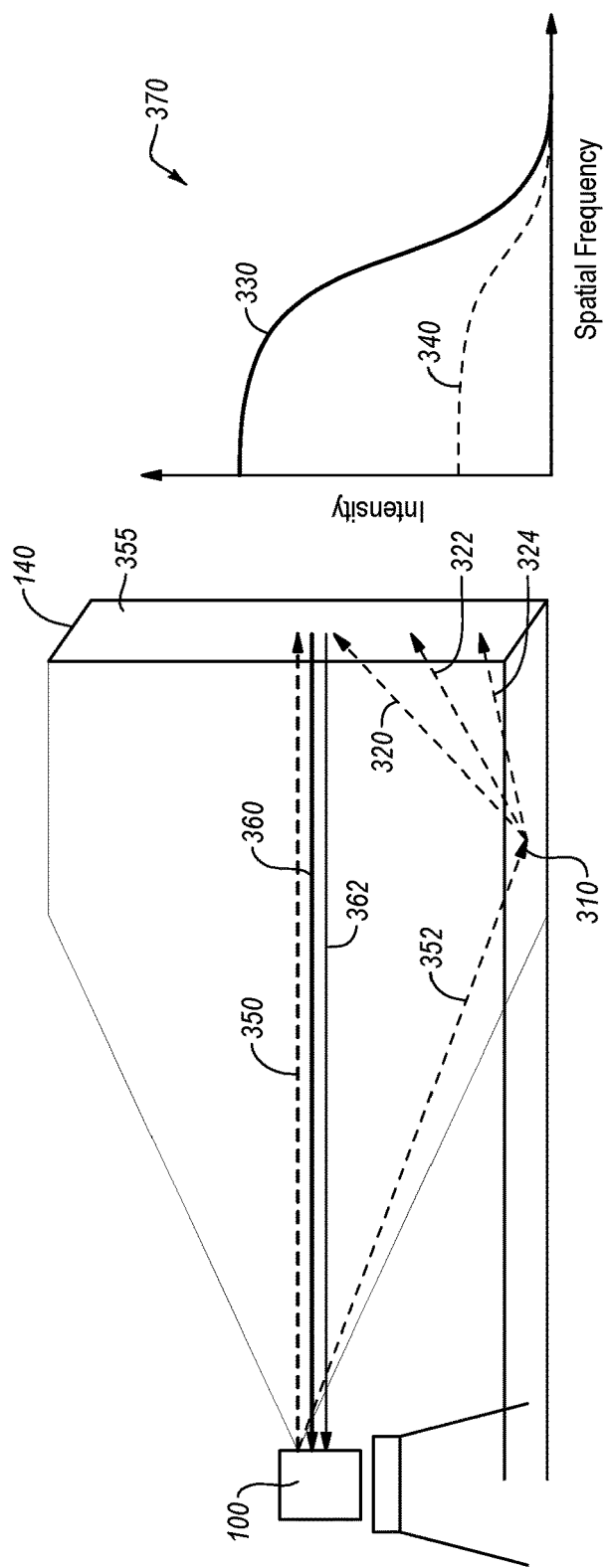

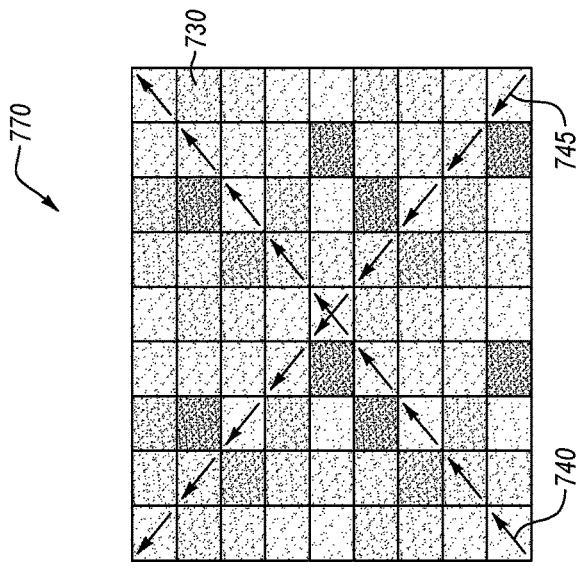
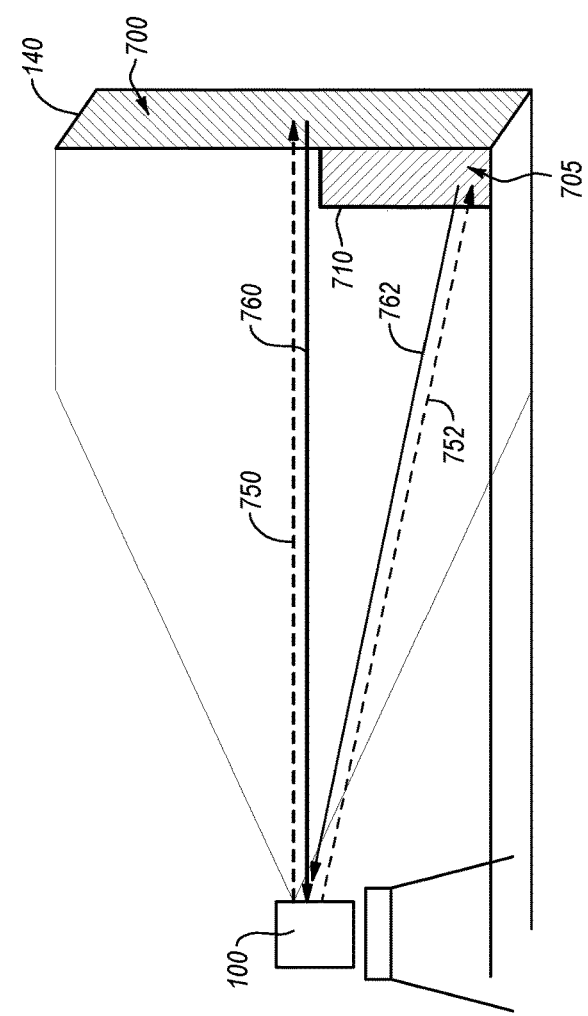
FIG. 7B
FIG. 7A

SPECULAR REFLECTION REMOVAL IN TIME-OF-FLIGHT CAMERA APPARATUS

CROSS-REFERENCE TO RELATED APPLICATIONS

This application claims the benefit of and priority to, U.S. Provisional Application Ser. No. 62/333,656, filed on May 9, 2016, entitled "FULL-FIELD AMCW LIDAR," which is incorporated by reference herein in its entirety.

BACKGROUND

The ability to identify objects within three-dimensional space has become an increasingly important technology. For example, autonomous vehicles may need to identify unknown objects within the vehicle's surrounding three-dimensional space. In some cases, it may be sufficient for the autonomous vehicle to merely identify the location of an object and avoid the identified object. In other cases, it may be necessary for the vehicle to correctly categorize the identified object as being, for example, a traffic sign, debris in the road, a pedestrian, another vehicle, or some other common obstacle.

Similarly, augmented reality and virtual reality systems can utilize three-dimensional mapping to incorporate a user's three-dimensional environment into the virtual and augmented reality worlds. For example, an augmented reality system may overlay visual information onto an object in the real world. In order to properly overlay the information, the augmented reality system may need to identify both the correct location of the object and the identity of the object within the real world. In contrast, within a virtual reality world, it may be desirable to track the location and movements of various different users who are participating within the same virtual reality world.

The ability to map objects within three-dimensional spaces involves many different technical challenges and design decisions. Several different technologies for mapping objects within three-dimensional spaces have been developed. These technologies include, for example, three-dimensional stereo vision, radar, sonar, Lidar (or other time-of-flight systems), range-finders, and other similar technologies. Implementing these technologies involves careful considerations regarding component characteristics and signal processing. For instance, some systems experience multipath, specular and other interference and noise during signal acquisition and processing. Accordingly, there is an ongoing need for improved systems that are capable of helping to mitigate problems associated with the interference and noise experienced during signal acquisition and processing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and apparatus configured to facilitate removal of specular reflection noise and/or interference from data received by a time-of-flight camera.

Some disclosed embodiments comprise a time-of-flight camera apparatus, and methods for using such, that is configured to distinguish between direct returns and specular reflections within time-of-flight camera data. For example, embodiments disclosed herein project patterns that are visually distinguishable when reflected within a specular reflection.

Some embodiments disclosed herein also include methods, systems, and apparatus for facilitating removal of specular reflection signal interference from light data. An illumination unit illuminates a target with a light source. The illumination unit is configured to project light with a spatial light pattern onto the target. A sensor unit can acquire light data that is reflected from the target. The light data comprises a directly reflected spatial light pattern and a specular reflected spatial light pattern. The directly reflected spatial light pattern and the specular reflected spatial light pattern comprise at least one spatial distinction that distinguishes the directly reflected spatial light pattern from the specular reflected spatial light pattern. A processing unit processes the light data. The processing unit is configured to distinguish the directly reflected spatial light pattern from the specular reflected spatial light pattern based upon the at least one spatial distinction.

Additional embodiments disclosed herein include a computer system for facilitating removal of specular reflection noise from light data. The computer system comprises one or more processors and one or more computer-readable media having stored thereon executable instructions that when executed by the one or more processors configure the computer system to perform various acts. For example, the system can perform an act of illuminating, using an illumination unit, a target with a light source.

The illumination unit is configured to project light with a spatial light pattern onto the target. The system can also perform the act of acquiring, with a sensor unit, light data that is reflected from the target. The light data comprises time-of-flight data for light that illuminated the target and a directly reflected spatial light pattern and a specular reflected spatial light pattern. The directly reflected spatial light pattern and the specular reflected spatial light pattern comprise at least one spatial distinction that distinguishes the directly reflected spatial light pattern from the specular reflected spatial light pattern. The system can further perform an act of generating specular-reflection-compensated light data by processing, with the one or more processors, the light data. The processing unit is configured to distinguish the directly reflected spatial light pattern from the specular reflected spatial light pattern based upon the at least one spatial distinction. The system can also perform an act of determining, with the one or more processors and based upon the specular-reflection-compensated light data, one or more distances that extend between the light source and one or more portions of the target.

Further, embodiments disclosed herein include methods for facilitating removal of specular reflection noise from light data. The method can include illuminating, using an illumination unit, a target with a light source. The illumination unit is configured to project light with a spatial light pattern onto the target. The method can also include acquiring, with a sensor unit, light data that is reflected from the target. The light data may comprise a directly reflected spatial light pattern and a specular reflected spatial light pattern. The directly reflected spatial light pattern and the specular reflected spatial light pattern comprise at least one spatial distinction that distinguishes the directly reflected spatial light pattern from the specular reflected spatial light pattern. The method can further comprise processing, with a processing unit, the light data. The processing unit is configured to distinguish the directly reflected spatial light pattern from the specular reflected spatial light pattern based upon the at least one spatial distinction.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates a schematic of an embodiment of a time-of-flight camera system transmitting and receiving signals.

FIG. 3B illustrates a chart depicting an embodiment of the spatial frequency of received time-of-flight signals.

FIG. 7A illustrates a schematic of another embodiment of a time-of-flight camera system transmitting and receiving signals.

FIG. 7B illustrates a visual depiction of an embodiment of received per-pixel light data.

DETAILED DESCRIPTION

Disclosed embodiments include systems, methods and apparatuses that are configured to help mitigate problems associated with the interference and noise experienced during image signal acquisition and processing.

Some embodiments provide significant technical improvements to the field of three-dimensional imaging by helping to remove noise and interference from the three-dimensional imaging processes, such as by compensating for multipath signal interference that otherwise diminishes the accuracy of three-dimensional imaging. Embodiments disclosed herein can also remove specular reflection signal data from a received three-dimensional imaging signal. Some embodiments also include more accurate distance detection, more accurate object detection, and less image noise. The improved and more accurate data is then processed for use within a number of different systems, such as, autonomous vehicles, augmented reality, virtual reality, robot vision, computer vision, and other similar related fields.

Figure 1:
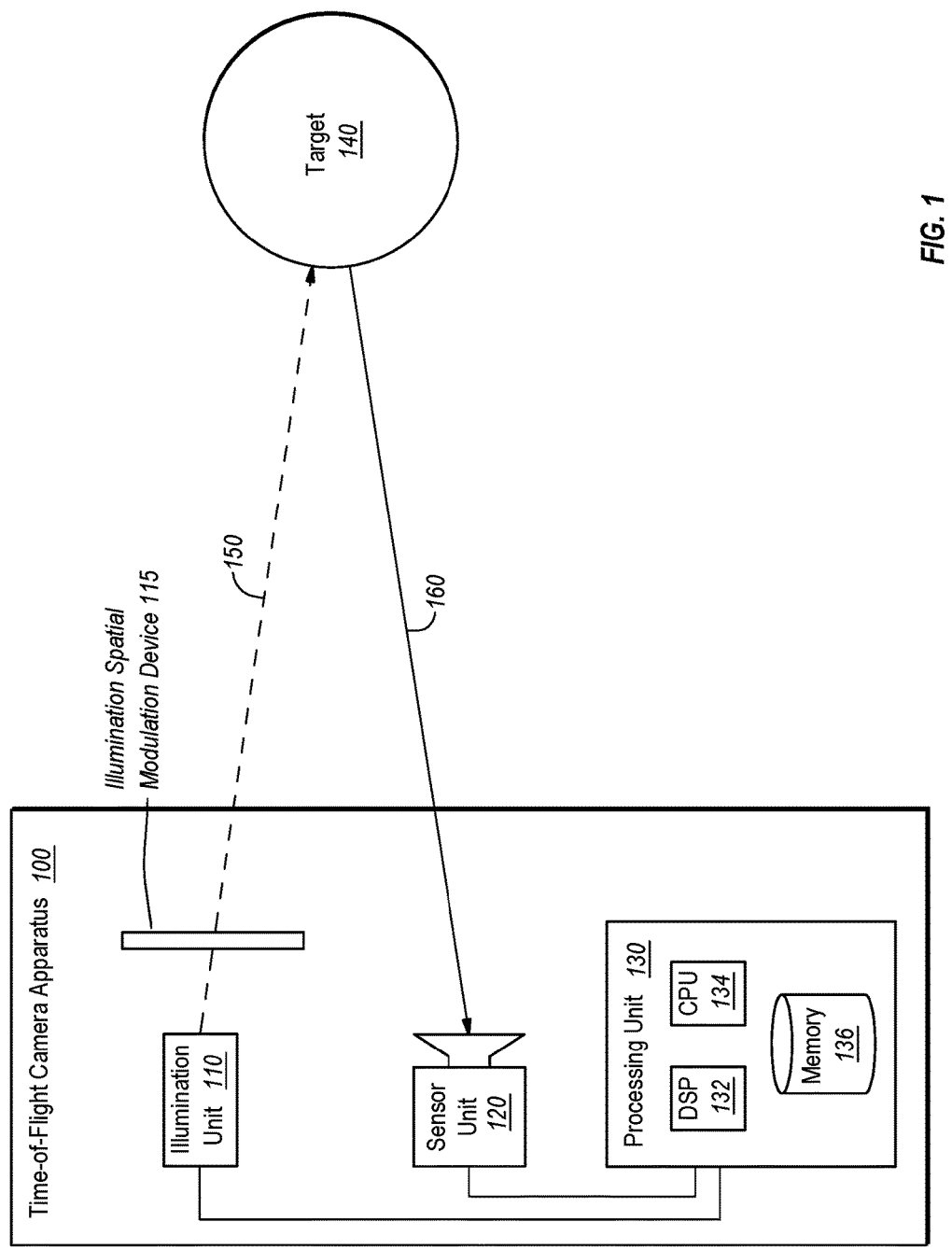
FIG. 1 illustrates a schematic of an embodiment of a time-of-flight camera apparatus and system.

Turning now to the figures, FIG. 1 illustrates a schematic of an embodiment of a time-of-flight camera apparatus 100 and system. As used herein a "time-of-flight camera apparatus" refers to any three-dimensional imaging system that utilizes time-of-flight measurements to determine distances within three-dimensional space. An example of such a system is a Lidar, which uses the time-of-flight of light signals to measure distances and to generate data relating to detected objects within three-dimensional space.

For the purposes of clarity and explanation, as used herein a time-of-flight camera apparatus 100 comprises one or more internal components. For example, the time-of-flight camera apparatus 100 is depicted as comprising an illumination unit 110, an illumination spatial modulation device 115, a sensor unit 120, and a processing unit 130. As illustrated, the processing unit 130 includes at least one hardware processor, such as the digital signal processor ("DSP") 132 or the central processing unit ("CPU") 134 currently represented in FIG. 1. However, it will be appreciated that the processing unit 130 need not include the DSP 132 or the CPU 134 in at least some embodiments (e.g., embodiments incorporating a FPGA, SoC, ASIC and/or other processing component(s) that may be contained within the processing unit 130). The processing unit 130 also includes, in some embodiments, one or more memory components, such as memory 136. The above listed individual components 110, 115, 120, 130, 132, 134, 136 are provided only for the sake of explanation and clarity. One of skill in the art will understand that the various components 110, 115, 120, 130, 132, 134, 136 can be otherwise combined, divided, described, or implemented.

The time-of-flight camera apparatus 100 depicted in FIG. 1 is shown emitting a projected light 150 onto a target 140. In particular, the illumination unit 110 is shown emitting the projected light 150 through an illumination spatial modulation device 115 and onto the target 140. In various embodiments, the illumination unit 110 may comprise any number of different types and configurations of light sources, including, but not limited to, light emitting diodes ("LEDs") and/or lasers. In some embodiments, the illumination source is amplitude modulated. The illumination spatial modulation device, which could be also be termed a pattern application structure, controls the illumination light field, which may be uniform or patterned. The illumination spatial modulation device comprises any physical device capable of controlling the distribution of the illumination emitted by the time-of-flight camera apparatus, specific embodiments may be comprised of one of more of engineered diffusers, holographic diffusers, diffractives, lenses, micromirror arrays, MEMs devices, filters, and any other optical or mechanical pattern application structure. Multiple illumination units with different filters may be used in some embodiments, being used to illuminate the scene simultaneously or sequentially or in any other manner.

As depicted, sensor unit 120 captures light data from the reflected light 160 that reflects off of the target 140. The sensor unit 120 may comprise an array of sensors (e.g., pixels) that receive light data from the reflected light 160. In various embodiments, sensor unit 120 comprises a modulated charge-coupled device ("CCD"), a CCD with a modulated image intensifier, a modulated complementary metal-oxide-semiconductor sensor ("CMOS"), or any other electronic imaging device. In some embodiments, the sensor unit correlates the received scene illumination with a reference waveform (hence the term sensor modulation). By shifting the reference waveform relative to the illumination, it is possible to estimate the intensity and relative phase of the returned light by taking one or more measurements, thus the time-of-flight of the measured illumination signal. In amplitude-modulated-continuous-wave lidar, the intensity and relative phase may commonly be expressed as a complex number, for which the phase is proportional to range (over some limited unambiguous interval). As used herein, "light data" refers to all information received by the sensor unit 120, including the modulation frequency of received light received, the modulation phase of received light, the intensity of received light, and/or other various detected attributes. One particular embodiment of 120 may be a one-dimensional imaging device. Note that the phase of the received light in different embodiments may refer to the phase of the light itself or the phase of an envelope modulating it.

Sensor unit 120 communicates the received light data to processing unit 130 for processing. As stated above, processing unit 130 can comprise a DSP 132, a CPU 134, and memory 136 for processing and analyzing the light data. In various embodiments the processing unit 130 can be integrated within a time-of-flight camera apparatus 100, or processing unit 130 can be located within a separate computing device that is in communication with the time-of-flight camera apparatus 100, such as a mobile computing device, a desktop computing device, or a cloud computing device.

Figure 2:
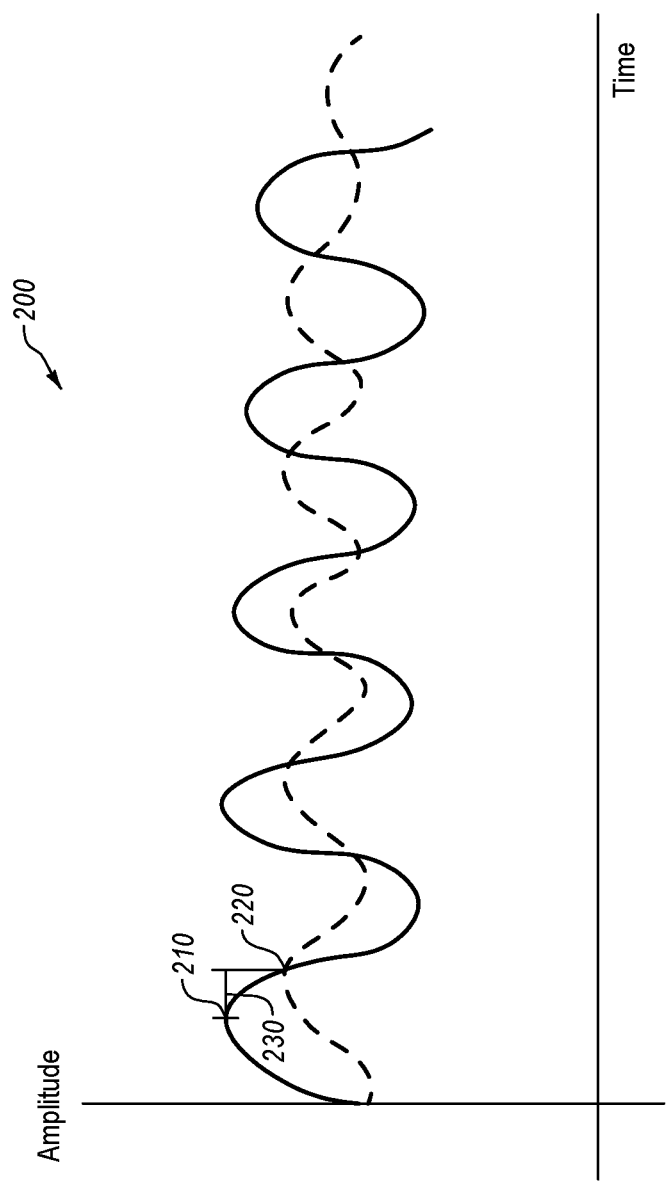
FIG. 2 illustrates a chart depicting an embodiment of a transmitted signal and a reflected signal in a time-of-flight system.

The processing unit 130 is configured to calculate the distance between the time-of-flight camera apparatus 100 and the target 140 based upon the acquired light data. For example, FIG. 2 illustrates a chart 200 depicting an embodiment of a transmitted signal (also referred to herein as "projected light 150") and a reflected signal (also referred to herein as "reflected light 160") in a time-of-flight system. The transmitted signal is depicted as projected light waveform 210 and the reflected signal is depicted as reflected light waveform 220. Due to the time-of-flight of the respective light 150, 160 a phase shift 230 exists between the projected light waveform 210 and the reflected light waveform 220. The processing unit 130 identifies the phase shift and calculates the distance between the sensor unit 120 and the target 140, in some embodiments, by using the following equation:

$$d = \frac{c}{4\pi f}\Phi$$

where d is the distance, c is the speed of light, $f$ is the modulation frequency, and $\phi$ is the phase shift. One of skill in the art will understand that the phase shift is indicative of the time-of-flight of the projected light 150 and reflected light 160 and is proportional to the distance between the time-of-flight camera apparatus 100 and the target 140. Additionally, one of skill in the art will understand that the above presented equation is only an example of one method for calculating distance within a time-of-flight system and that suitable additional and/or alternative methods and equations can also be used.

When imaging unknown objects and/or unknown environments, various challenges can arise. For example, a time-of-flight camera apparatus 100 may receive interference or noise in the form of multipath signal interference such as diffuser or specular reflections from surfaces on the target or within the environment, and other similar false readings. This multipath interference includes, but is not limited to, diffuse, Lambertian, glossy or specular reflections, subsurface diffusion, intralens scattering, scattering/reflection within the illumination optics, direct coupling of the illuminator to the sensor, internal reflections within LCD monitors, semi-transparent objects and any other scenarios that result in unwanted superposition of multiple signals. It can be challenging for the processing unit 130 to distinguish between the desired signals and interference.

In at least one embodiment, the processing unit 130 removes interference from the light data by applying a high-pass filter to the light data. As used herein, a high-pass filter refers to a filter that attenuates low frequencies, but does not necessarily pass all high frequencies. For example, in various embodiments, the high-pass filter is optimized in both the directionality of the filter and the bandwidth of the filter for a specific pattern or type of scene. As such, in at least one embodiment, the high-pass filter may also be referred to as a band-pass filter or filter with multiple passbands as long as low frequencies are attenuated in at least one direction. In various alternative or additional embodiments, the high-pass filter comprises edge preserving filters, non-linear filters, infinite impulse response filters, finite response filters, filters in the frequency domain, or any other type of filter known to experts in the field. Accordingly, various embodiments of a time-of-flight camera apparatus 100 for removing noise and interference from received light data are disclosed herein.

In some embodiments of this disclosure, the term frame is used to refer to a complex domain measurement (composed of several sensor readouts). In other embodiments, the term frame refers to a single sensor readout.

Multipath Signal Interference Mitigation

FIG. 3A illustrates a schematic of an embodiment of a time-of-flight camera system transmitting and receiving signals. The depicted time-of-flight camera apparatus 100 comprises the various components described above in relation to FIG. 1, including an illumination unit (110 in FIG. 1), a sensor unit (120 in FIG. 1), and a processing unit (130 in FIG. 1). The time-of-flight camera apparatus 100, through the illumination unit, is configured to project a uniform pattern 355 onto a target 140, which in this case is a blank wall. In at least one implementation, the uniform pattern 355 is produced by not filtering the projected light 350 emitted by the illumination unit 110. In at least one alternate implementation, the uniform pattern 355 is produced by using a uniform physical filter (115 in FIG. 1).

As depicted in FIG. 3A, the time-of-flight camera apparatus 100 emits projected light 350. Projected light 350 travels through the optical medium (e.g., air) until it impacts and reflects from target 140 in the form of reflected light 360. The time-of-flight camera apparatus 100 then receives reflected light 360 through sensor unit 120. In some embodiments, the time-of-flight camera apparatus 100 also emits projected light 352. Projected light 352 also travels through the optical medium until it impacts a scattering point 310 on an object or surface and then reflects into various multipath light signals 320, 322, 324.

As used herein, a multipath perturbed signal (or light) is any signal measured by the time-of-flight camera apparatus 100 that is composed of the intended direct return plus an additional active illumination signal that is not a direct return. A direct return is a signal that has travelled directly from the illuminator to the scene target and back to the sensor. The additional signal/s excluding the direct return are referred to herein as multipath, multipath signals, or multipath interference, each of which are used interchangeably. As used herein, multipath interference includes, but is not limited to, diffuse, Lambertian, glossy or specular intra-scene and intra-sensor reflections, subsurface diffusion, intralens scattering, scattering/reflection within the illumination optics, direct coupling of the illuminator to the sensor, near-end-echo, internal reflections within LCD monitors, semi-transparent objects and any other scenarios that result in the unwanted superposition of multiple signals within a single sensor measurement.

Multipath may occur within the scene (intra-scene multipath) or within the time-of-flight camera apparatus (100). A common cause of multipath interference is a signal that reflects from more than a single surface before being detected by the time-of-flight camera apparatus 100. For example, as depicted, the multipath light signals 320, 322, 324 reflect first from the scattering point 310 and then again off of target 140. After both of these reflections, the time-of-flight camera apparatus 100 receives at least a portion of the multipath light signals 320, 322, 324 in multipath reflected light 362.

For the purposes of time-of-flight calculations, projected light 350 and reflected light 360 comprise "true signal" readings that can properly indicate a distance between the time-of-flight camera apparatus 100 and the exterior surface of target 140. In contrast, projected light 352 and resulting multipath reflected light 362 comprise indirect measurements, or "global light" values, that add noise and interference to the measurements taken by sensor unit 120.

For example, FIG. 3B illustrates a chart 370 depicting an embodiment of the spatial frequencies present in a 1D or 2D image of received time-of-flight signals under uniform or smooth illumination. In particular, FIG. 3B depicts light data in the form of the spatial frequency of the true signal 330, derived from reflected light 360, and multipath interference 340, derived from multipath reflected light 362. The light data can comprise an array of spatial domain information received from light reflected by the target 140. The array of spatial domain information may map to the pixels of the sensor unit 120 that gather the light data. The true signal 330 and multipath interference 340 depicted in FIG. 3B may comprise a Fourier transform of the spatial frequency of the array of light data.

Multipath interference 340 adds noise and potentially incorrect readings to the light data received by the-time-of-flight camera apparatus 100. In particular, instead of measuring the time-of-flight of a single reflection, the multipath interference 340 adds information that comprises multiple reflections. Due to the overlapping natures of the two received signals, true signal 330 and multipath-interference signal 340, the time-of-flight camera apparatus 100 may have difficulty properly determining the distance to the target 140.

Because the illumination is uniform/near uniform, the true signal measures the actual spatial frequencies present in the scene (what would be measured by an ideal camera, with no multipath interference). The uniform scene illumination is modulated in the spatial domain by the scene itself. Reflections can be considered to be analogous to an additional illumination source (e.g., scattering point 310). If the multipath signal is scattered such that when it illuminates the target 140, as may occur in diffuse and glossy reflection, the multipath signal (i.e., multipath reflected light 362) appears similar to uniform illumination, but from a different distance and position to the time-of-flight camera apparatus 100. As a result, the spatial frequency spectrum of the multipath interference 340 in image-space as measured by the time-of-flight camera apparatus 100 is well approximated by a scaled version of the frequency spectrum of the true signal 330. This makes it difficult to isolate the multipath signal from the true signal.

Figures 4A, 4B:
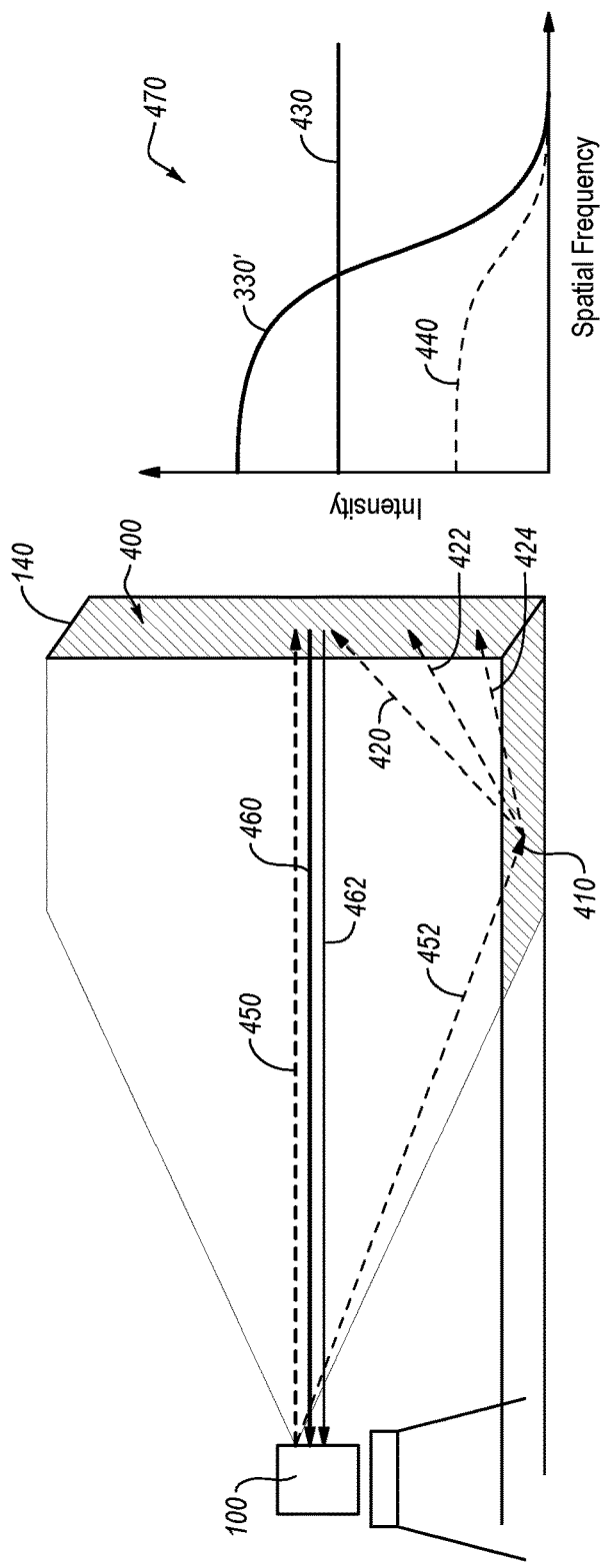
FIG. 4A illustrates a schematic of another embodiment of a time-of-flight camera system transmitting and receiving signals.
FIG. 4B illustrates a chart depicting another embodiment of the spatial frequency of received time-of-flight signals.

FIG. 4A illustrates a schematic of another embodiment of a time-of-flight camera system transmitting and receiving signals. The depicted time-of-flight camera apparatus 100 emits a high spatial frequency pattern 400 (also referred to herein as a "high spatial frequency light pattern") onto target 140. The high spatial frequency pattern 400 may be integrated into projected light 450 by physical filter 115 within the time-of-flight camera apparatus 100. Projected light 450 reflects from the target 140 in the form of reflected light 460 and is detected by the time-of-flight camera apparatus 100. Similar to FIG. 3A, the time-of-flight camera apparatus 100 emits projected light 452, which upon impacting scattering point 410 scatters into various multipath light signals 420, 422, 424. The time-of-flight camera apparatus 100 may then detect the multipath light signals 420, 422, 424 in the form of multipath reflected light 462.

FIG. 4B illustrates a chart depicting another embodiment of the spatial frequency of received time-of-flight signals (i.e., reflected light 460 and multipath reflected light 462). In particular, FIG. 4B depicts reflected light data 470 in the form of true signal 430, derived from reflected light 460, and multipath interference 440, derived from multipath reflected light 462. FIG. 4B also depicts exemplary true signal 330', which depicts the true signal (shown as 330 in FIG. 3B) received by the time-of-flight camera apparatus 100 in FIG. 3B. As depicted, the high spatial frequency pattern 400 has caused the spectral energy of the true signal 430 to be redistributed to higher frequencies, while leaving the spectral energy from the multipath interference 440 largely in the same relatively lower frequencies as shown in FIG. 3B.

In various embodiments, applying a high spatial-frequency pattern 400 to the projected light 450 redistributes spectral energy to higher frequencies. The applied high spatial-frequency pattern 400 may comprise a line light pattern, as depicted, or any other high spatial-frequency pattern 400—including a pseudo-random light pattern. In at least one embodiment, the high-spatial frequency pattern 400 is applied to the projected light 150 through an illumination spatial modulation device 115, through an adaptive illumination spatial modulation device 115 (not shown), or through any other means.

Figure 5:
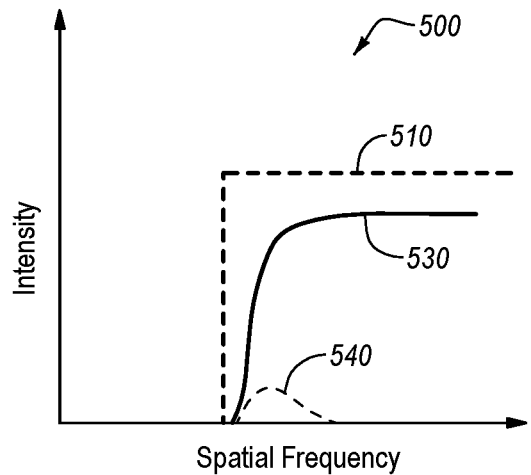
FIG. 5 illustrates a chart depicting an embodiment of the processed spatial frequency of received time-of-flight signals.

After the projected light 350 has been emitted, the sensor unit 120 acquires light data (e.g., reflected light 360) reflected from the target 140. Once the spectral energy of the true signal 430 has been redistributed to higher frequencies, by the high spatial frequency pattern, the processing unit 130 processes the light data by applying a high-pass filter to the reflected light data within either the spatial domain, or the spatial frequency domain or by any other high-pass or band-pass filter method known to experts in the field. For example, FIG. 5 illustrates a chart depicting an embodiment of the processed light data 500 of the received time-of-flight signals (i.e., reflected light 450 and multipath reflected light 462). In at least one embodiment, the high-pass spatial filter 510 may be implemented optically before integration of the signal by the sensor unit 120. In this case, the processing unit does not perform a high-pass filter, as it is unnecessary.

As depicted, the high-pass filter 510 generates multipath-compensated light data 500 by removing a large portion of the multipath interference from the light data leaving a small proportion of residual multipath (540) and a large portion of true signal 530. As used herein multipath-compensated light data 500 comprises light data that has been processed to remove multipath interference. In various embodiments, the time-of-flight camera apparatus 100 extracts the true signal 530 from the received light data using only a single frame of information. As such, in at least one embodiment, the same high spatial frequency pattern 400 is used for multiple frames of light data without requiring any alignment of subsequent patterns or frames. Whereas applying a high-pass spatial filter to a standard intensity image (monochrome, RGB) results in an image that is less representative of the true image, in Amplitude-Modulated-Continuous-Wave lidar the phase of the high-pass filtered data encodes the true time-of-flight more accurately than the raw signal.

The processing unit 130 then analyzes the true signal 530 using methods known in the art to determine the distance between the time-of-flight camera apparatus 100 and various points on the target 140. Using this information, the processing unit 130 generates a three-dimensional image of the target 140, or otherwise identify the three-dimensional characteristics of the target 140. Accordingly, embodiments of the time-of-flight apparatus 100 utilize a high spatial-frequency pattern 400 to facilitate the removal of multipath interference from light data received by the sensor unit 120.

In at least one embodiment, a highly sparse illumination pattern, such as a dot pattern on a grid or a pseudorandom dot pattern (among others) may be projected onto the target 140. Because an impulse function is particularly broadband, this is ideal for multipath removal, albeit at the expense of spatial resolution. For example, the processing unit 130 isolates high spatial frequency content from the low frequency content by detecting the sparse illumination signal locations and thresholding out all other regions (effectively high pass filtering the data). The processing unit 130 achieves this by using a global intensity threshold where all range-values with signal level below a set threshold are ignored/invalidated. In contrast, in an alternative or additional embodiment, the processing unit 130 achieves the result by comparing to a local mean over a surrounding spatial region and invalidating/ignoring data below some threshold defined relative to this mean. This results in a sparse depth-map, which may be subsequently densified (using techniques known to those skilled in the art) to produce a dense depth-map.

In various embodiments, the time-of-flight camera apparatus 100 may apply different high spatial-frequency patterns 400 to concurrent frames. For example, the processing unit 130 may be configured to control an adaptive filter (e.g., illumination spatial modulation device 115) such that the filter emits different high spatial-frequency patterns during different frames. For instance, the processing unit 130 may cause the time-of-flight camera apparatus 100 to emit a horizontal line light pattern during a first frame and a vertical line light pattern during a subsequent frame. In other frames the processing unit 130 may cause the time-of-flight camera apparatus 100 to emit a line light pattern at an angle or to emit a pattern that is not made up of parallel lines. Alternating patterns may further reduce noise within the light data in part by counteracting patterns that are present on the target 140 or within the environment.

Additionally, in at least one embodiment, applying a high-pass filter 510 to the light data can cause phase ambiguity within the light data. In particular, if the phase and amplitude of the measured signal is encoded as a complex number, then the processing unit 130 may be unable to distinguish between phases of 0°-180° and 180°-360° after being high-pass filtered. In at least one embodiment, the processing unit 130 is capable of doubling the phase such that the processed data appears as if the data were originally measured at double the modulation frequency of the data. The resulting approach halves the maximum unambiguous ranging distance. In another embodiment, the 180° degree ambiguity is resolved by minimizing the phase difference between the newly disambiguated data and the original unfiltered data. In another embodiment, the sign of the real and imaginary parts is individually disambiguated. In another embodiment, the disambiguation is performed by combining measurements at multiple different modulation frequencies using phase unwrapping approaches known to those skilled in the art. Some of these modulation frequency measurements may not have been high-pass filtered.

Accordingly, various systems, apparatus, and methods are disclosed herein that provide significant technological advancements to the field of three-dimensional imaging and distance detection. For example, embodiments disclosed herein provide a time-of-flight camera apparatus 100 and accompanying method that remove substantial portions of multipath interference from light data within a time-of-flight system. Additionally, embodiments disclosed herein remove substantial portions of multipath interference from light data with only a single frame of light data. One will understand, however, the systems, apparatus, and methods disclosed herein are capable of being applied to schemes other than light and still fall within the bounds described herein, including but not limited to sonar, radar and by using other types of longitudinal or transverse waves such as electromagnetic radiation, sound and pressure waves In at least one additional or alternative embodiment, the processing unit 130 can generate multipath-compensated light data by applying a filter within the spatial domain to the reflected light data which computes a regression curve between data components of spatial neighborhoods. The processing unit 130 can use the regression parameters associated with the regression curve to compute multipath light data. The processing unit then denoises the multipath-compensated light data with the reflected light data.

In at least one embodiment, the processing unit 130 calculates the regression parameters by minimizing the sum of square error between the regression curve and the data samples as $R^2=\text{sum}\{i=1 \ldots N\}(\text{Im}(c_i)-f(c_i, a, b, \ldots))$, with $c_i$ being the N complex data samples within the spatial neighborhood, the set $\{a, b, \ldots\}$ being the regression parameters and $R^2$ being a quantity describing the quality of the regression. $R^2$ can also be used to represent the mismatch of the regression curve with the given data $c_i$, corresponding to the uncertainty of the fit and serving as a measure for the likelihood of success of the process of computing the multi path removal data, and being made available for filtering steps. In an additional or alternative embodiment, the processing unit 130 calculates the regression parameters by using a linear function as regression model, such that $f(c_i, a, b)=a+b*\text{Re}(c_i)$, and $\text{Phi}_{cor}=a \tan(b)$ being the phase of the multipath interference data for the given spatial neighborhood. In at least one embodiment, the processing unit 130 uses a closed form solution to compute the linear regression. Further, in at least one embodiment, $f(c_i, \ldots)$ is a higher order polynomial, for instance quadratic or cubic, or another suitable function. In the case that a pixel in the imaging device is associated with a high uncertainty, the processing unit 130 labels the pixel data as invalid.

One will appreciate that embodiments disclosed herein can also be described in terms of flowcharts comprising one or more acts for accomplishing a particular result. For example, FIG. 6 and the corresponding text describe acts in various systems for performing methods and/or stand-alone methods for removing multipath signal interference from light data. The acts of FIG. 6 are described below.

Figure 6:
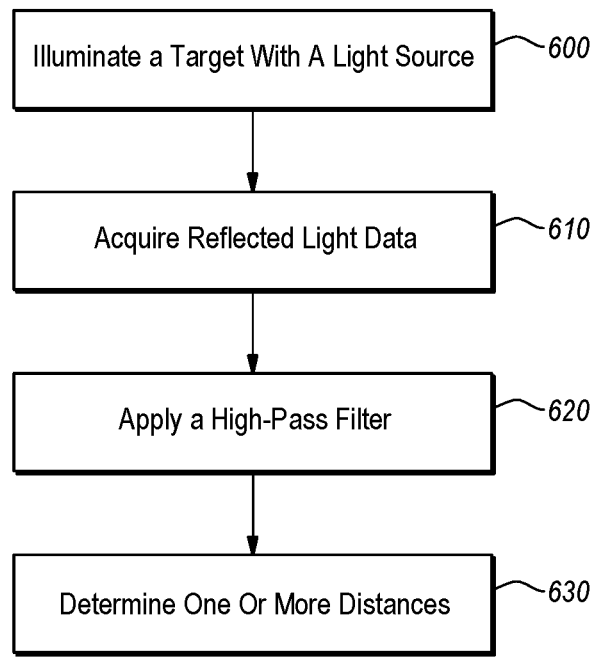
FIG. 6 illustrates a flowchart for an embodiment of a method for facilitating removal of multipath signal interference from light data.

For example, FIG. 6 illustrates that a flowchart for an embodiment of a method for facilitating removal of multipath signal interference from light data comprises an act 600 of illuminating a target with a light source. Act 600 includes illuminating, with an illumination unit 110, a target 140 with a light source. The illumination unit 110 is configured to project a high spatial-frequency pattern onto the target in such a way as to redistribute spectral energy to higher frequencies. For example, as depicted and described in FIG. 4A and the accompanying description, the time-of-flight camera apparatus 100 emits projected light 450 onto the target 140. Projected light 450 comprises a high spatial frequency pattern 400—in the depicted case, a line light pattern with horizontal lines. In alternate embodiments, the high spatial-frequency pattern comprises any high spatial frequency light pattern, including a pseudo-random light pattern.

Additionally, FIG. 6 illustrates that the method includes an act 610 of acquiring reflected light data. Act 610 comprises acquiring, with a sensor unit 120, reflected light data (i.e. data from reflected light 160) reflected from the target 140. The reflected light data comprises an array of spatial domain information received from light reflected by the target 140. For example, as depicted and described in FIGS. 4A and 4B and the accompanying description, the time-of-flight camera apparatus 100 acquires the reflected light 160 in the form of light data that is gathered by the sensor unit 120 (shown in FIG. 1). The sensor unit 120 may comprise an array of sensors (e.g., pixels) that each gather light data from the reflected light 160. In at least one embodiment, the processing unit 130 calculates spatial domain information from the light data received at the respective pixels.

FIG. 6 also illustrates that the disclosed method includes, in some embodiments, an act 620 of applying a high-pass filter. Act 620 comprises processing, with the one or more processors, the reflected light data. The one or more processors process the reflected light data by applying a high-pass filter within the spatial domain to the reflected light data. For example, as depicted and described in FIGS. 4A-5 and the accompanying description, the processing unit 130, also referred to herein as a "processor," applies a high-pass filter 510 to the reflected light data 470, which is depicted at true signal 430 and multipath interference 440 in FIG. 4B. The resulting multipath-compensated light data 500 substantially removes the effects of multipath interference 440 from the light data.

In an alternative embodiment, a least square linear fit is applied to the reflected light data within a given spatial neighborhood. The fit parameters, in particular the slope of the linear function, are used to estimate the multipath interference for that given neighborhood. Additionally, a quantity describing the quality of the fit can be used to estimate the uncertainty of the process of determining the multipath interference of that given neighborhood. By performing this operation for all neighborhoods of interest, for instance by using a sliding window, the multipath interference and the estimation uncertainty can be computed for all pixels. The multipath interference data are used to generate multipath-compensated light data 500, which substantially removes the effects of multipath interference 440 from the light data. The estimation uncertainty data can be used to support the process of computing multipath-compensated light data and thus increasing the data quality.

Further, FIG. 6 illustrates that the method optionally includes an act 630 of determining one or more distances. Act 630 can comprise determining, with the one or more processors and based upon the multipath-compensated light data 500, one or more distances that extend between the time-of-flight camera apparatus 100 and one or more portions of the target 140. For example, as depicted and described in FIGS. 1 and 2 and the accompanying description, the processing unit 130 identifies a phase shift 230 within a reflected light waveform 220. As explained herein, the reflected light waveform 220 can comprise multipath-compensated light data 500 that has had at least a substantial portion of the multipath interference removed. Using various methods, including those disclosed above, the processing unit 130 calculates a distance between the sensor unit 130 and the target 140 based upon the phase shift.

Specular Reflection Interference Mitigation

In addition to difficulties introduced by multipath interference, which have been described above, in various embodiments, specular reflections can also introduce noise and interference within a time-of-flight camera system. As used herein, a "specular reflection" occurs when light that impacts a surface from predominately a single direction is reflected away from the surface at predominantly a single outgoing angle. A simple example of a specular reflection is a reflection from a mirror.

The appearance of a specular reflection on a target 140 or within a target's environment can introduce significant noise and interference into light data. For example, FIG. 7A illustrates a schematic of another embodiment of a time-of-flight camera system transmitting and receiving signals. The depicted time-of-flight camera apparatus 100 is shown emitting projected light 750 onto a target 140. The time-of-flight camera apparatus 100 acquires the reflected light 760 that reflects from the target 140 back towards the time-of-flight camera apparatus 100.

The depicted embodiment also shows projected light 752 traveling from the time-of-flight camera apparatus 100 and impacting a mirror-like surface 710 adjacent to the target 140. In at least one embodiment, the mirror-like surface 710 reflects specular reflection light 762 back towards the time-of-flight camera apparatus 100. While a "mirror-like surface 710" is depicted and described herein, one of skill in the art will understand that many different types of surfaces can produce specular reflection. As explained above, and as understood by one having skill in the art, specular reflection light 762 adds noise and interference to the light data processed by the time-of-flight camera apparatus 100.

In at least one embodiment, to facilitate removal of the specular reflection noise, the illumination unit 110, in conjunction with an illumination spatial modulation device 115, emits a spatial light pattern 700 onto the target 140. The depicted embodiment of a spatial light pattern 700 comprises parallel lines extending in a first direction. In the depicted example, the parallel lines extend at a 45° angle across the target 140. In contrast to the spatial light pattern 700 that is depicted on the target 140, the specular reflection of the mirror-like surface 710 creates a reflection symmetry in the spatial light pattern 700 that results in a specular reflected spatial light pattern 705 that comprises parallel lines extending in a second direction that is different than the first direction of the spatial light pattern 700. In particular, the depicted specular reflected spatial light pattern 705 comprises parallel lines traveling at a 135° angle across the mirror-like surface 710.

Due to the specular reflection of the mirror-like surface 710, the spatial light pattern 700 is distinguishable from the specular reflected spatial light pattern 705. As used herein, a distinguishable specular reflected spatial light pattern 705 comprises any reflected light pattern that is visually, or otherwise, distinguishable from the spatial light pattern 700. For example, the spatial light pattern 700 comprises parallel lines traveling at a 45° angle, while the specular reflected spatial light pattern 705 comprises parallel lines traveling at a 135° angle.

The spatial light pattern 700 can be directly reflected back towards the time-of-flight camera apparatus 100 in the form of reflected light 760. Similarly, the specular reflected spatial light pattern 705 can be reflected back towards the time-of-flight camera apparatus 100 in the form of specular reflection light 762. Once sensor unit 120 has received light data from both the reflected light 760 and the specular reflection light 760, the processing unit 130 distinguishes the directly reflected spatial light pattern 700 from the specular reflected spatial light pattern 705 based upon at least one spatial distinction.

As used herein, the spatial light pattern 700 refers to the light pattern that is projected onto the target 140, while the directly reflected light pattern refers to the reflected light pattern that is acquired by the sensor unit 120 within the time-of-flight camera apparatus 100. However, because the spatial light pattern 700 corresponds with the directly reflected light pattern, at times they will be referred to interchangeably using the same reference number 700.

In at least one embodiment, the processing unit 130 distinguishes the directly reflected spatial light pattern 700 from the specular reflected spatial light pattern 705. For example, FIG. 7B illustrates an exemplary visual depiction of an embodiment of received per-pixel light data 770. The depicted received per-pixel light data 770 is provided only for the sake of explanation and example. One of skill in the art will understand that the depicted received per-pixel light data 770 may not necessarily explicitly depict actual light data. Each pixel 730 within the received per-pixel light data 770 may be representative of a pixel on a CMOS sensor or CCD sensor within the sensor unit 120.

In at least one embodiment, the processing unit 130 distinguishes the directly reflected spatial light pattern 700 from the specular reflected spatial light pattern 705 by applying a directional filter in a direction that corresponds with a direction of the spatial light pattern 700 and/or the specular reflected spatial light pattern 705. For example, the depicted spatial light pattern 700 comprises parallel lines traveling at a 45° angle, while the specular reflected spatial light pattern 705 comprises parallel lines traveling at a 135° angle. Accordingly, to distinguish between the respective light patterns 700, 705, the processing unit 130 applies a directional filter in a 45° direction 740, which corresponds to the direction of the spatial light pattern 700. Similarly, to distinguish between the respective light patterns 705, 700, the processing unit 130 applies a directional filter in a 135° direction 745, which corresponds to the direction of the specular reflected spatial light pattern 705.

Further, in at least one embodiment, the processing unit 120 applies a high-pass directional filter in the direction of spatial light pattern 700 (i.e., direction 740 in FIG. 7B). Similarly, the processing unit 120 is operable to additionally or alternatively apply a low-pass directional filter in the direction of specular reflected light pattern 705 (i.e., direction 745 in FIG. 7B). As such, the processing unit 120 is capable of generating specular-reflection-compensated light data by at least partially distinguish between light data that is provided by the reflected light 760 and the specular reflection light 762.

While the depicted light pattern 700 and specular reflected light pattern 705 comprise parallel lines traveling at a 45° angle and parallel lines traveling at a 135° angle, respectively, in various embodiments additional or other patterns can be used. For example, in at least one embodiment, the spatial light pattern 700 comprises a pattern of parallel lines travelling in any non-axial direction. In this embodiment, the corresponding specular reflected spatial light pattern comprises parallel lines traveling in a different non-axial direction, as determined by an axis of reflection.

Figure 8A:
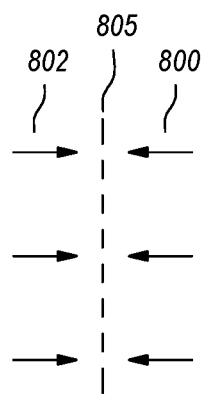
FIG. 8A illustrates a visual depiction of an embodiment of a spatial light pattern.
Figure 8B:
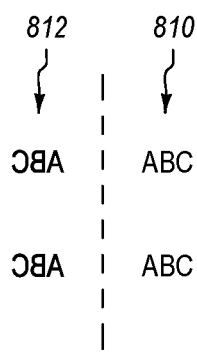
FIG. 8B illustrates a visual depiction of another embodiment of a spatial light pattern.
Figure 8C:
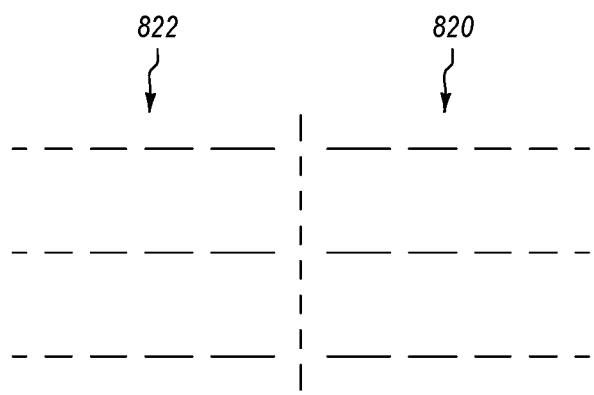
FIG. 8C illustrates a visual depiction of yet another embodiment of a spatial light pattern.

FIGS. 8A-8C illustrate various visual depictions of embodiments of spatial light patterns that may be used to filter out interference caused by specular reflection. For example, FIG. 8A depicts a light pattern 800 that comprises images of arrows. On the opposing side of the depicted axis of reflection 805, a mirrored light pattern 802 also comprises images of arrows, but the arrows point in a different direction. As such, a specular reflection of light pattern 800 results in a spatially distinguishable mirrored light pattern 802. One of skill in the art will understand that light pattern 800 is merely exemplary and is not limited to arrows. Similar features and functionality can be obtained from any image or design that is not symmetric across its y-axis. Other patterns that are asymmetric in both rotation and arbitrary reflections, such as a pattern composed of oriented lowercase letter 'q's are particularly suitable.

Using methods described above, the processing unit 130 is capable of distinguishing between light data associated with light pattern 800 and light data associated with mirrored lighted pattern 802. For example, the processing unit 130 is capable of utilizing an image processing and/or pattern recognition algorithms to distinguish between the respective patterns 802, 800. The processing unit 130 then filters out light data that is associated with the mirrored light pattern 802, and its associated specular reflection.

FIG. 8B depicts a light pattern 810 that comprises encoded information and a mirrored light pattern 812 that comprises a reflected version of the same encoded information. The depicted information comprises "ABC," but one will understand that a variety of different encoded information can be used. For example, in various embodiments, the encoded information may comprise signal modulations, binary encodings, ASCII encodings, numerical or letter encodings, or any other encoding that is identifiable by processing unit 130.

Once the processing unit 130 has received the light data comprising light patterns 810 and mirrored light pattern 812, the processing unit 130 distinguishes between light data associated with light pattern 810 and light data associated with the mirrored light pattern 812. For example, the processing unit 130 decodes the information within the received light data to distinguish between the respective patterns 812, 810. The processing unit 130 then filters out light data that is associated with the mirrored light pattern 812, and its associated specular reflection.

As a further exemplary embodiment, FIG. 8C depicts a light pattern 820 that comprises a gradient moving in a particular direction and a mirrored light pattern 822 that comprises a gradient moving in the opposite direction. In various embodiments, using methods described above, the processing unit 130 distinguishes between light data associated with light pattern 820 and light data associated with the mirrored light pattern 822. For example, the processing unit 130 is capable of identifying the direction of the gradients within the received light data to distinguish between the respective patterns 822, 820. The processing unit 130 then filters out light data that is associated with the mirrored light pattern 822, and its associated gradient direction.

Accordingly, in various embodiments, particular spatial light patterns (e.g., light patterns 700, 800, 810, 820) are projected onto a target 140 by an illumination unit 110 within a time-of-flight camera apparatus 100. A processing unit 130 within the time-of-flight camera apparatus 100 then receives reflected light data and distinguish between reflected light 760 and specular reflected light 762 based upon the light patterns within the light data. The processing unit 130 then filters out at least a portion of the interference caused by the specular reflection.

In at least one embodiment, the scene is illuminated with dots or an otherwise highly sparse pattern. Using a sparse pattern reduces the probability of a direct return being superimposed on a specular return. Because multipath interference will most typically have travelled farther than the direct return (the exception being intra-optics scattering, near-end-echo etc.), it is possible to remove the specular reflections using the time-of-flight information over a spatial region of the image. In at least one embodiment, the processing unit 130 scans across an image with a window. The processing unit 130 detects the point closest to the sensor unit 120 as the correct return, and considers it to be representative of the correct range for the pixel at the window center. In at least one embodiment, this spatial time-of-flight information is a type of spatial distinction.

In an alternative or additional embodiment, the processing unit 130 detects each dot and then compares each dot to its neighborhood. The processing unit 130 ignores/invalidates any dots that are at a substantially greater distance from the sensor unit 120 as detected by time-of-flight. In some embodiments the sparse dots are densified to create a dense depth map.

In some embodiments, a filter is applied to regions of the image that finds the minimal time-of-flight within the spatial region in order to remove specular reflections, which have larger time-of-flight. In other embodiments, filters with similar or equivalent actions are used, including spatial techniques based on local or global histograms and statistical techniques that find the peak, centre, mean, mode or median of the statistical distribution over time-of-flight corresponding to the direct return as distinct from the distribution corresponding to the specular reflection.

In some embodiments, image processing or machine learning techniques including, but not limited to, neural networks, support vector machines and adaptive filters are used to distinguish between the illumination pattern present in the direct returns and the transformed pattern present in the specular reflections. In some cases the transformed pattern after reflection are modeled as an affine transformation of the true illumination pattern. In some embodiments, there is also a correction for radial distortion induced by the imaging or illumination optics, before or after this transformation.

One will appreciate that embodiments disclosed herein can also be described in terms of flowcharts comprising one or more acts for accomplishing a particular result. For example, FIG. 9 and the corresponding text describe acts in various systems for performing methods and/or stand-alone methods for removing specular reflection signal interference from light data. The acts of FIG. 9 are described below.

Figure 9:
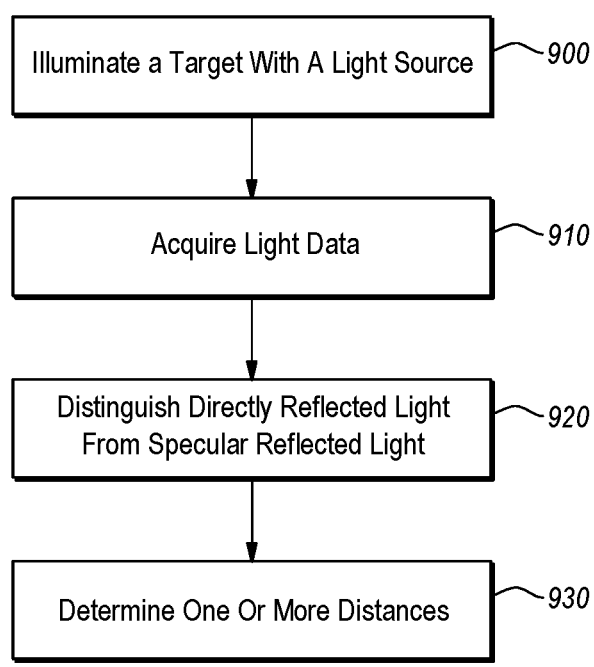
FIG. 9 illustrates a flowchart for an embodiment of a method for facilitating removal of specular reflection noise from light data.

For example, FIG. 9 illustrates that a flowchart for an embodiment of a method for facilitating removal of specular reflection signal interference from light data comprises an act 900 of illuminating a target with a light source. Act 900 includes illuminating, using an illumination unit, a target with a light source. The illumination unit is capable of projecting light with a spatial light pattern 700 onto the target. For example, as depicted and described in FIG. 7A and the accompanying description, an illumination unit 110 (shown in FIG. 1) within a time-of-flight camera apparatus 100 emits projected light 750 onto a target 140. The projected light 750 can comprise a spatial light pattern 700 that is also projected onto the target 140.

Additionally, FIG. 9 illustrates that the method includes an act 910 of acquiring light data. Act 910 comprises acquiring, with a sensor unit 120 (shown in FIG. 1), light data that is reflected from the target 140. The acquired light data comprises time-of-flight data for light that illuminated the target, a directly reflected spatial light pattern 700, and a specular reflected spatial light pattern 705. The directly reflected spatial light pattern 700 and the specular reflected spatial light pattern 705 comprise at least one spatial distinction that distinguishes the directly reflected spatial light pattern 700 from the specular reflected spatial light pattern 705.

For example, as depicted and described in FIGS. 7A-8C and the accompanying description, a sensor unit 120 within a time-of-flight camera apparatus 100 receives light data from reflected light 760 and specular reflection light 762. As explained in FIG. 2, the light data comprises time-of-flight data that can be used to determine distances between the time-of-flight camera apparatus 100 and the target 140. Additionally, reflected light 760 comprises spatial light pattern 750, while specular reflection light 762 comprises specular reflected spatial light pattern 705. The spatial light patterns 700, 705 comprise identifiable distinctions, such as parallel lines that travel in different directions.

FIG. 9 also illustrates that the method includes an act 920 of distinguishing directly reflected light from specular reflected light. Act 920 comprises generating specular-reflection-compensated light data by processing, with the one or more processors, the light data. The processing unit 130 is configured to distinguish the directly reflected spatial light pattern 700 from the specular reflected spatial light pattern 705 based upon the at least one spatial distinction. For example, as depicted and described in FIG. 7B and the accompanying description, the processing unit 130 is capable of applying a directional high-pass filter to the per-pixel light data 770 in a 45° direction 740, which corresponds to the direction of the spatial light pattern 700. Applying such a filter may remove a substantial portion of the interference caused by the specular reflection light 762.

Further, FIG. 9 illustrates that the method optionally includes an act 930 of determining one or more distances. Act 930 comprises determining, with the one or more processors and based upon the specular-reflection-compensated light data, one or more distances that extend between the light source and one or more portions of the target 140. For example, as depicted and described in FIGS. 1 and 2 and the accompanying description, the processing unit 130 can identify a phase shift 230 within a reflected light waveform 220. As explained herein, the reflected light waveform 220 can comprise specular-reflection-compensated light data that has had at least a substantial portion of the spectral-reflection interference removed. Using various methods, including those disclosed above, the processing unit 130 calculates a distance between the sensor unit 130 and the target 140 based upon the phase shift.

Uniform Pattern to Identify Environmental Patterns

In addition to difficulties introduced by interference and noise, which have been described above, in various embodiments, the environment and/or target themselves can introduce some challenges when removing noise and interference from light data. For example, when utilizing a projected light pattern to assist in removing noise and interference, strong patterns on the target or within the environment can impact the time-of-flight camera apparatus's 100 ability to utilize the projected pattern to remove the noise and interference. As such, methods and systems for compensating for environmental and target patterns provided significant technical advantages.

Figure 10:
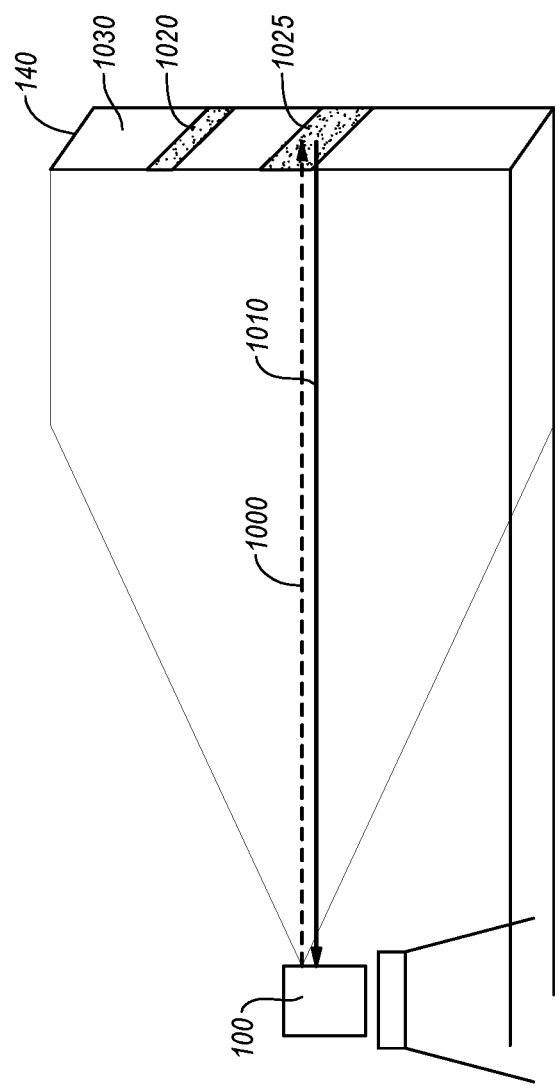
FIG. 10 illustrates a schematic of another embodiment of a time-of-flight camera system transmitting and receiving signals.

For example, FIG. 10 illustrates a schematic of another embodiment of a time-of-flight camera system transmitting and receiving signals. The depicted time-of-flight camera apparatus 100 is shown emitting projected light 1000 onto a target 140. The time-of-flight camera apparatus 100 acquires the reflected light 1010 that reflects from the target 140 back towards the time-of-flight camera apparatus 100.

In the depicted embodiment, the target 140 comprises a pattern in the form of two bars 1020, 1025 painted across the wall. The bars 1020, 1025 are provided for the sake of clarity and example. In at least one embodiment, interference is caused by high-spatial frequency patterns on the target 140 or in the environment. Nevertheless, to avoid confusion in the figure and description, the two bars 1020, 1025 are described herein as the conflicting patterns. In at least one embodiment, the two bars 1020, 1025 interfere with a light pattern that is projected by the time-of-flight camera apparatus 100. For example, the reflected light 1010 may carry light data back to the time-of-flight camera apparatus 100 that is influenced by the two bars 1020, 1025. The time-of-flight camera apparatus 100 may have difficulty distinguishing between light data that is a result of the two bars 1020, 1025 and light data that is a result of a projected light pattern.

Accordingly, in at least one embodiment, during a first frame, the time-of-flight camera apparatus 100 projects a uniform light pattern 1030 onto the target 140. The uniform light pattern 1030 may comprise any pattern that does not include significant high frequency spatial variations. In at least one embodiment, the uniform pattern is locally smooth as high frequency content will result in performance degradation. For example, the light pattern may simply comprise a projected light that was not patterned. The reflected light 1010 may carry back to the time-of-flight camera apparatus 100 light data that corresponds with the uniform light pattern 1030.

Figure 11:
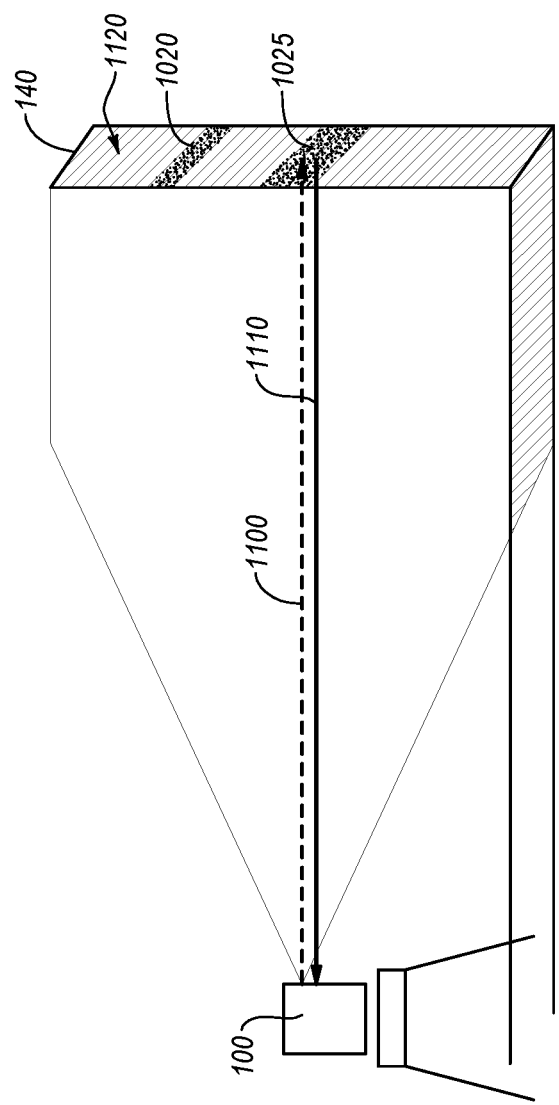
FIG. 11 illustrates a schematic of another embodiment of a time-of-flight camera system transmitting and receiving signals.

In addition to projecting a uniform light pattern 1030 onto the target 140, in at least one embodiment, in another frame, or a second frame, an illumination unit 110 within the time-of-flight camera apparatus 100 also projects a high spatial-frequency pattern onto the target 140 in such a way as to redistribute spectral energy to higher frequencies. For example, FIG. 11 illustrates a schematic of another embodiment of a time-of-flight camera system transmitting and receiving signals. In particular, the depicted time-of-flight camera apparatus 100 is shown emitting projected light 1100 onto a target 140. In at least one embodiment, the time-of-flight camera apparatus 100 comprises an illumination unit 110 that projects light through an illumination spatial modulation device 115 that is intermediate the illumination unit 110 (i.e. the light source) and the target 140. In the depicted embodiment, the projected light 1100 comprises a high spatial-frequency pattern 1120 in the form of parallel lines, but, in alternative embodiments, any number of different high spatial-frequency patterns can be used.

In at least one embodiment, different captured frames are associated with different frame frequencies. For Example, $F_{f1}$, $F_{f2}$ and $F_{f3}$ could be 3 frames at frequencies f1, f2 and f3. In one embodiment, the time-of-flight camera apparatus 100 gives rise to multiple frames with uniformed and patterned light projection. Further, in at least one embodiment, all frequencies except one (e.g. f3 typically the highest frequency) are performed only with uniform illumination. The last frequency f3 is performed using multiple frames of uniform and patterned illumination. The multipath removal algorithm then works only on frequency f3.

In at least one embodiment, a sensor unit 120 within the time-of-flight camera apparatus 100 acquires first light data during the first frame. The first light data corresponds with the reflected light 1010 with the uniform light pattern 1030. Additionally, the sensor unit 120 within the time-of-flight camera apparatus 100 acquires second light data during the second frame. The second light data corresponds with the reflected light 1110 with the high spatial-frequency pattern 1120. In at least one embodiment, the processing unit 130 decreases the effect of a patterned target or environment on the final light data by dividing the second light data from the first light data. After receiving both the first light data from the first frame and the second light data from the second frame, a processing unit 130 in communication with the time-of-flight camera apparatus 100 calculates normalized light data by dividing, within the spatial domain, the second light data by the first light data. In at least one embodiment, the division of the second light data by the first light data comprises a pixel-by-pixel division of the light data. Additionally, in at least one embodiment, the division is a complex number division, thus both the amplitude and phase is normalized.

Once the normalized light data has been calculated, the processing unit 130 processes the light data using the various methods disclosed herein. For example, in at least one embodiment, the processing unit 130 facilitates removal of multipath signal interference from the normalized light data by applying a high-pass filter within the spatial domain to the normalized light data. As disclosed above, the high-pass filter may substantially remove the multipath interference from the received light data.

Similarly, in at least one embodiment, the processing unit 130 facilitates removal of specular reflection interference from the normalized light data by applying a high-pass directional filter in the direction of a projected light pattern to the normalized light data. As disclosed above, the high-pass directional filter may substantially remove the specular reflection interference from the received light data.

In an alternative embodiment, a least square linear fit is applied to the reflected light data within a given spatial neighborhood. The fit parameters, in particular the slope of the linear function, are used to estimate the multipath interference for that given neighborhood. Additionally, a quantity describing the quality of the fit can be used to estimate the uncertainty of the process of determining the multipath interference of that given neighborhood. By performing this operation for all neighborhoods of interest, for instance by using a sliding window, the multipath interference and the estimation uncertainty can be computed for all pixels. The multipath interference data are used to generate multipath-compensated light data, which substantially removes the effects of multipath interference from the light data. The estimation uncertainty data can be used to support the process of computing multipath-compensated light data and thus increasing the data quality.

In various embodiments, the time-of-flight camera apparatus 100 projects, from the same location, different light patterns at different times and for different purposes. For example, the illumination spatial modulation device 115 depicted in FIG. 1 may comprise an adaptive filter (e.g., illumination spatial modulation device 115). As used herein, an adaptive filter, comprises a filter that can be configured to generate multiple different patterns. For example, an adaptive filter may be configured to generate a high spatial-frequency pattern of parallel horizontal lines as a first pattern and a uniform pattern (or lack of a pattern) as a second pattern. As such, in at least one embodiment, the time-of-flight camera apparatus 100 projects the high spatial-frequency pattern and the uniform pattern from the same location at different times.

In at least one embodiment, the processing unit 130 causes the adaptive filter to generate particular patterns. For example, the processing unit 130 is operable to cause the adaptive filter to generate a high spatial-frequency pattern comprising parallel lines extending in a first direction. The processing unit 130 is also configured to dictate the direction in which the lines extend such that the adaptive filter can generate angled lines as disclosed above in pattern 700 of FIG. 7.

Additionally, in at least one embodiment, the processing unit 130 causes the adaptive filter to generate particular patterns at particular intervals. For example, the processing unit 130 is capable of causing the adaptive filter to generate a uniform pattern during a first frame. The processing unit then causes the adaptive filter to generate a high spatial-frequency pattern during a second frame as disclosed above. Further, the processing unit causes the adaptive filter to generate the high spatial-frequency pattern again during a third frame. The high spatial-frequency pattern during the third frame may also redistribute spectral energy to higher frequencies.

The sensor unit 120 then acquires third light data reflected from the target 140 within the third frame. The processing unit then calculates normalized light data by dividing, within the spatial domain, the third light data by the first light data. As such, in at least one implementation, the processing unit 130 is operable to configure the adaptive filter to project a uniform light pattern 1030 less frequently than the adaptive filter generates a high spatial-frequency pattern. For example, in some cases, it may be sufficient to receive first light data from a single projection of a uniform light pattern 1030. The processing unit 130 divides light data received from multiple spatial high-frequency patterns to that same first light data. In some embodiments, the processing unit 130 configures the adaptive filter to generate a uniform pattern once every two high spatial-frequency patterns, once every three high spatial-frequency patterns, once every five high spatial-frequency patterns, once every ten high spatial-frequency patterns, or at any other interval.

Additionally, in at least one embodiment, the processing unit 130 causes the adaptive filter to project a variety of different high spatial-frequency patterns in addition to, or instead of, projecting the uniform light pattern 1030. For example, the processing unit 130 causes the adaptive filter to project a high spatial-frequency pattern that comprise parallel lines traveling in a horizontal direction. The processing unit 130 then causes the adaptive filter to project a different high spatial-frequency filter that comprises parallel lines traveling at an angle. Further, the processing unit 130 causes the adaptive filter to subsequently project a different high spatial-frequency filter that comprises pseudo-random noise. Alternating the spatial high-frequency patterns can cause help compensate for patterns within the environment or on the target 140, with or without the division by the uniform light pattern 1030.

One will appreciate that embodiments disclosed herein can also be described in terms of flowcharts comprising one or more acts for accomplishing a particular result. For example, FIG. 12 and the corresponding text describe acts in various systems for performing methods and/or stand-alone methods for removing multipath signal interference from light data. The acts of FIG. 12 are described below.

Figure 12:
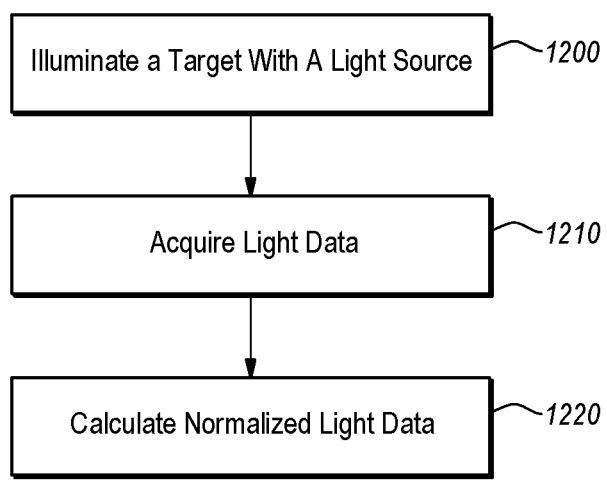
FIG. 12 illustrates a flowchart for an embodiment of a method for compensating for light reflected from non-uniform targets.

For example, FIG. 12 illustrates that a flowchart for an embodiment of a method for compensating for light reflected from non-uniform targets comprises an act 1200 of illuminating a target with a light source. Act 1200 includes illuminating, with an illumination unit 110, a target 140. During a first frame, the illumination unit 110 is configured to project a uniform pattern 1030 onto the target 140. During a second frame, the illumination unit 110 is configured to project a high spatial-frequency pattern 1120 onto the target in such a way as to redistribute spectral energy to higher frequencies. For example, as depicted and described in FIGS. 10 and 11 and the accompanying description, during a first frame, the time-of-flight camera apparatus 100 emits projected light 1000 onto the target 140. Projected light 1000 comprises a uniform light pattern 1030. The time-of-flight camera apparatus 100 then emits projected light 1100 onto the target 140 during a second frame. Projected light 1100 comprises a spatial high-frequency pattern 1120 that is configured to redistribute spectral energy to higher frequencies. In various embodiments, "configuring" the illumination unit 110 to project a particular type of pattern may comprise configuring a filter, such as illumination spatial modulation device 115, to generate a particular pattern.

Additionally, FIG. 12 illustrates that the method includes an act 1210 of acquiring light data 1210. Act 1210 comprises acquiring, with a sensor unit 120, first light data reflected from the target within the first frame and second light data reflected from the target within the second frame. For example, as depicted and described in FIGS. 10 and 11 and the accompanying description, the sensor unit 120 acquires reflected light 1010 that comprises first light data from the first frame. The first light data may comprise information that corresponds with the uniform light pattern 1030. Additionally, the sensor unit 120 acquires reflected light 1110 that comprises second light data from the second frame. The second light data may comprise information that corresponds with the spatial high-frequency pattern 1120.

Further, FIG. 12 illustrates that the method includes an act 1220 of calculating normalized light data. Act 1220 comprise calculating, with the one or more processors (e.g., processing unit 130), normalized light data by dividing, within the spatial domain (e.g., a pixel-by-pixel division), the second light data by the first light data. In at least one embodiment, the normalized light data is independent of object reflectivity and is used to reduce multipath. For example, as depicted and described in FIGS. 10 and 11 and the accompanying description, the processing unit 130 divides the second light data by the first light data.

Guided Filter

In various embodiments, processing light data received by the sensor unit 120 can introduce various defects and ambiguities into the resulting data. For example, applying a high-pass filter to the light data that results from a spatial high-frequency pattern can result in data that is highly resistant to multipath interference but that has substantially reduced precision with respect to the originally received light data. Similarly, applying a high-pass filter can result in data with 180° phase ambiguity. In at least one embodiment, at least some of the defects and ambiguities in the resulting data can be addressed using the original, unprocessed light data that is received by the sensor unit 120.

Figure 13:
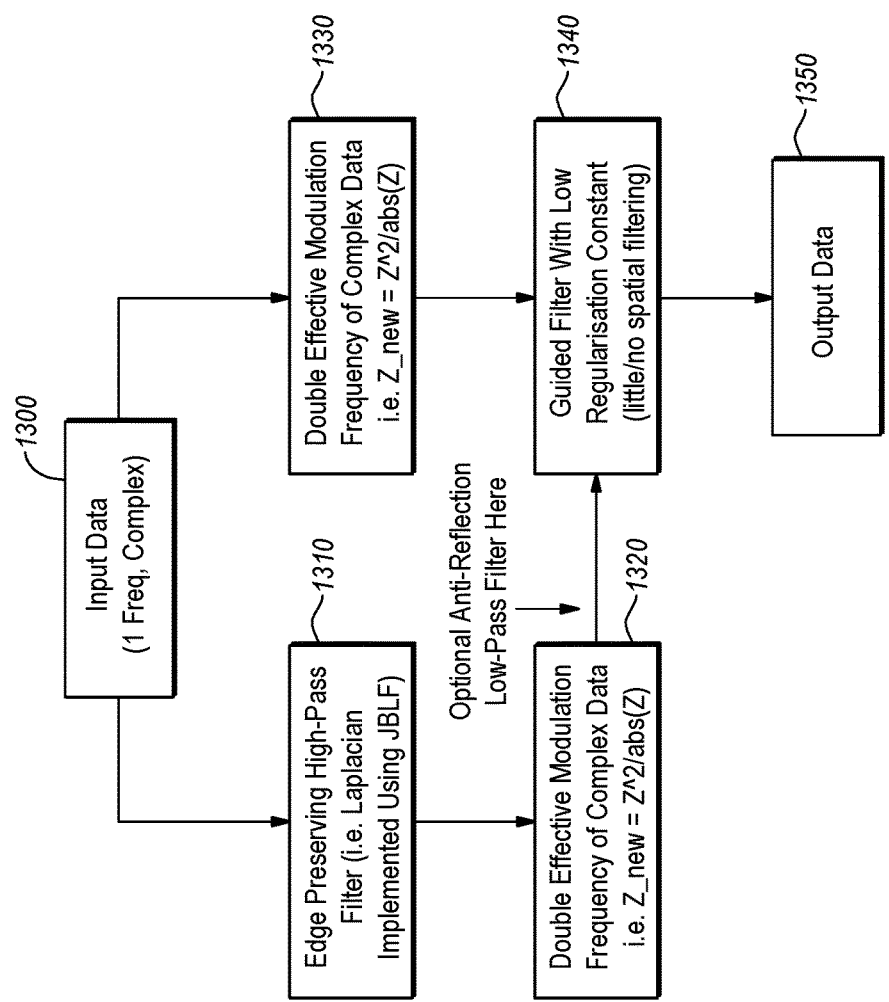
FIG. 13 illustrates a flowchart for an embodiment of a method for processing reflected light data.

For example, FIG. 13 illustrates a flow chart for an embodiment of a method for processing reflected light data. In step 1300 the time-of-flight camera apparatus 100 receives input data. For example, as depicted in FIG. 4A, the time-of-flight camera apparatus 100 receives reflected light 460. In particular, sensor unit 120 receives input data in the form of light data from the reflected light 460.

In step 1310 the processing unit 130 applies a high-pass filter to the light data. As depicted and described with respect to FIG. 4B and FIG. 5, applying the high-pass filter 510 to the input data removes a substantial portion of multipath interference 440 from the input data. In addition to removing multipath interference, applying the high-pass filter can also introduce various defects and ambiguities into the resulting data.

In step 1320 the processing unit 130 doubles the effective modulation frequency of the resulting data. Doubling the effective modulation frequency of the resulting data results in the halving of any ambiguity distance and the removal of any sign ambiguity. Optionally, in at least one embodiment, after doubling the effective modulation frequency of the resulting data, a low-pass filter is applied to the resulting data to further remove reflection noise. As alternative embodiment to doubling the effective modulation frequency, the phase can be determined by assuming that the sign of the phase is whatever gives the least phase error relative to the originally received light data.

After the input data has been processed through steps 1310 and 1320, the processing unit 130 processes the resulting data with a guided filter in step 1340. The guided filter may comprise the light data that was originally received from reflected light 460 in step 1300 (i.e., the guidance image). In the case of the guided filter, however, the light data is not filtered with a high-pass filtered, but in step 1330 the effective modulation frequency is doubled to match the resulting data out of step 1320. At step 1350 the final output data can be processed for determining distances or generating a three-dimensional image.

The guided filter is a maximum a posteriori method for estimating a denoised image (i.e. final data) based on fitting a local model to determine each individual pixel's value. The fitting uses a Gaussian likelihood function combined with a Gaussia prior. A regularization parameter allows a denoised image to be biased towards smoothness. In practice, the processing unit 130 may be less directed towards constraining smoothness than it is directed towards attempting to fix data with no signal using the spatial information inherent in the guide image.

Accordingly, in various embodiments disclosed herein, a time-of-flight system is operable to accurately determine distances within three-dimensional space and/or to generate accurate three-dimensional images. Additionally, methods and systems disclosed herein overcome significant technical challenges in the art. For example, methods and systems disclosed herein substantially reduce multipath interference received by a time-of-flight system. Additionally, methods and systems disclosed herein substantially reduce specular reflection interference and noise received by a time-of-flight system. Further, methods and systems disclosed herein overcome problems when processing light data from patterned targets and environments.

Various embodiments for removing noise and interference from light data have been described herein. One of skill in the art will understand that various embodiments can be explained mathematically. For example, assume that data values associated with each respective pixel in the sensor unit 120 are complex numbers representing the brightness (magnitude) and phase (angle). The sensor unit 120 provides two-dimensional arrays of such values representing a scene. Then assume if O equals the true multipath-free complain domain values encoding phase and amplitude in a scene, $I_1$ equals illumination pattern 1, $I_2$ equals illumination pattern 2, $MP_1$ equals normalized multipath present in a current scene with Illumination Pattern 1, $MP_2$ equals normalized multipath present in a current scene with Illumination Pattern 2, $F_1$ equals the frame acquired by a camera with Pattern 1, and $F_1$ equals the frame acquired by a camera with Pattern 1. Therefore:

$$(I_1+MP_1)*O=F_1$$

$$(I_2+MP_2)*O=F_2$$

Assuming that Illumination Pattern 1 (i.e., $I_1$) and Illumination Pattern 2 (i.e., $I_2$) are both at least partially known and that both pattern produce substantially the same multipath interference then:

$$MP_1*LP(I_2)=MP_2*I_1$$

additionally:

$$(I_1-I_2)*O=F_1-F_2$$

In at least one embodiment, it may be beneficial to know the exact relationships between $I_1$ and $I_2$.

If we assume that $I_1$ is uniform and $I_2$ is high frequency, then $$\frac{F_2}{F_1} = \frac{O*(MP_2+I_2)}{O*(MP_1+I_1)} = \frac{MP_2+I_2}{MP_1+I_1}$$

Thus we can see that the true ideal complex domain measurements of the scene disappear when we normalize/divide one image by the other, the residual value instead models the relationship between the illumination patterns and the normalized multipath perturbation. Given our knowledge that the spectrum of multipath interference is concentrated in the low frequencies and that $I_2$ is a high spatial frequency pattern, we can write that $$HP\left(\frac{F_2}{F_1}\right) = \frac{HP(I_2)}{MP_1 + I_1}$$

where HP(X) is a high-pass filter of X. In at least one embodiment, the high-pass filter HP(X) can be replaced by a least square linear fit as described herein. It follows that $$\text{Phase}\left(HP\left(\frac{F_2}{F_1}\right)\right) = \pm\text{phase}(MP_1 + I_1)$$

because we know that $I_2$ is a real number.

Using the above established relationship, a processing unit solves for O using the following equation:

Phase(O)=Phase($F_1$)±Phase(HP($F_2/F_1$))

In at least one embodiment, Phase(HP($F_2/F_1$)) is known to vary relatively slowly. Additionally, the quality of the data may be best where F2 varies sharply to produce a good signal. Hence, in some embodiments, it is beneficial to compute this term averaging the values for many pixels in a local neighborhood of a pixel of interest and more heavily weighting the terms where F2 (or F2/F1 since F1 varies slowly) varies the most. Such an estimate can then be computed by averaging many phase terms where phase values of closer pixels are given larger weight and phases between pixels with greater differences between the pixels are also given greater weight.

As an example let C(Pi)=the value of F2/F1 at pixel P. Additionally, let d(Pi−Pj) be some distance metric between Pi and Pj. The processing unit 130 can then calculate Est(Pi)=[sum_over_j (1/d(Pi−Pj)*(C(Pi)−C(Pj))*phase(C (Pi)−C(Pj))]/[sum_over_j 1/d(Pi−Pj)*(C(Pi)−C(Pj))]. Such an estimate may result in better quality because data from regions where the phase estimate term is less reliable or meaningful is given less weight. In various embodiments, the term (C(Pi)−C(Pj)) may vary for two reasons: 1) a desired variation in the illumination pattern, which is desirable, or 2) an undesired variation in the multipath signal, which is undesirable.

In at least one embodiment, the estimate can be further improved by weighting more heavily those pixels that correspond to type 1 variances and disregard type 2 variances. It then follows that if $I(P_j)$ is an estimate of the illumination intensity in F2, then: Estimate of $(P_i)$=

$$\hat{P}_i = \frac{\sum_j \frac{I(P_i - P_j) * \text{phase}(C(P_i) - C(P_j))}{d(P_i - P_j)}}{\sum_j \frac{I(P_i - P_j)}{d(P_i - P_j)}}$$

The processing unit 130 can calculate a good estimate of $(I(P_i)-I(P_j))$ using a variety of different schemes. For example, the processing unit 130 knows the original pattern of F2. As observed in the image from the sensor unit 120 the pattern depends on distance and is shifted differently depending on the distance. By using the approximate distance provided by, for example F1, a reasonable estimate of the shift can be obtained. In at least one embodiment, the processing unit 130 moves the pattern over the region neighboring pixel $P_j$ to find the position with the best fit which will be the highest correlation between the pattern and F2/F1. We can use the pattern as a matched filter to find this position. Accordingly, the processing unit 130 can use data from neighboring (but perhaps not adjacent pixels) to a pixel $P_j$ to improve the estimate of HP(F2/F1) at location $P_j$. The processing unit 130 weights more heavily pixels $P_j$ closest to $P_j$ and Pixels $P_j$ that have the most dissimilar illumination value from $P_j$.

In the case that only a single high spatial-frequency pattern is used the equation can be more simply solved as:

Phase(O)≈±Phase(HP($F_2$))

In reality, both of the above equations calculate an estimate of O, not phase(O), that allows further filter to be achieved in the complex domain—in addition to thresholding—before conversion to a phase angle.

In some embodiments, more than two patterns are used. In one such embodiment the ideal complex domain measurement may be solved for by $$\text{Phase}(O) = \text{Phase}(F_1) \pm \text{Phase}\left(f\left(HP\left(\frac{F_2}{F_1}\right), HP\left(\frac{F_3}{F_1}\right), \ldots HP\left(\frac{F_N}{F_1}\right)\right)\right)$$

Where $f(x_1, \ldots, x_n)$ is a function that combines the high passed filtered data from n−1 normalised measurements with different or similar patterns. Embodiments of this function may include summation with selective negation of some of the arguments, taking the argument with the maximal modulus, an arbitrary mathematical function or a lookup table. A related embodiment is implemented by $$\text{Phase}(O^2) = \text{Phase}(F_1^2) \pm \text{Phase}\left(f\left(\frac{HP\left(\frac{F_2}{F_1}\right)^2}{\left|HP\left(\frac{F_2}{F_1}\right)\right|}, \frac{HP\left(\frac{F_3}{F_1}\right)^2}{\left|HP\left(\frac{F_3}{F_1}\right)\right|}, \ldots \frac{HP\left(\frac{F_N}{F_1}\right)^2}{\left|HP\left(\frac{F_N}{F_1}\right)\right|}\right)\right)$$

Which combines the high pass filtered data after converting to an unambiguous phase representation as if the data had been measured at double the illumination modulation frequency.

Various methods can also be used to improve the resulting data from the above described equations. For example, one of the potential problem is that at the sign transition/complex domain zero crossing in the spatial image, the signal can go to zero. This results in bands of poor quality data. There are several potential mitigation approaches that can be used. In a first embodiment, a processing unit invalidates data where |HP($F_2/F_1$)| (i.e. the complex modulus of the high-pass filtered signal) is low. In this way poor quality data is ignored.

In at least one embodiment, the illuminator is positioned relative to the sensor such that the triangulation disparity is aligned with the projected pattern and the projected pattern can be calibrated in a fixed manner. This calibration is then used in combination with the one or more of the high frequency pattern and uniform images in order to estimate multipath free range. In a variant of this embodiment, time-of-flight data is used to estimate the triangulation disparity for an arbitrary pattern such as to correct for the disparity.

In an additional embodiment, the processing unit fills in missing data using neighboring pixels. For example, by using a fixed kernel spatial filter, or an edge preserving filter such as the bilateral filter missing data is gathered from neighboring pixels. Further, in at least one embodiment, a simplified filter, similar to the guided filter, is also possible. Essentially, the simplified filter determines each pixel's value by fitting a local region (centered around the specific pixel location) of the uniform image to the estimate of 0. This is similar to the Guided filter, except that it involves fitting one less basis vector and there is no regularization (thus it is computationally simpler).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Some of the disclosed computer systems are time-of-flight systems that include cameras and laser or other light emitting devices, as disclosed herein.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A time-of-flight camera apparatus configured to facilitate removal of specular reflection noise from light data, the apparatus comprising:
   an illumination unit for illuminating a target with a light source, wherein:
      the illumination unit is configured to project light with at least one spatial light pattern onto the target, wherein the at least one spatial light pattern comprises a pattern that is oriented according to a known direction;
   a sensor unit for acquiring light data that is reflected from the target, wherein:
      the light data comprises a directly reflected spatial light pattern oriented in a first direction that corresponds to the known direction, and a specular reflected spatial light pattern comprises light data oriented in a second direction that is different from the first direction, and
      the difference between the first direction and the second direction comprises at least one spatial distinction that distinguishes the directly reflected spatial light pattern from the specular reflected spatial light pattern; and
   a processing unit for processing the light data, wherein:
      the processing unit is configured to distinguish the directly reflected spatial light pattern from the specular reflected spatial light pattern based upon the at least one spatial distinction.

2. The time-of-flight camera apparatus as recited in claim 1, wherein the spatial light pattern corresponds with the directly reflected spatial light pattern.

3. The time-of-flight camera apparatus as recited in claim 1, wherein the directly reflected spatial light pattern comprises parallel lines extending in the first direction.

4. The time-of-flight camera apparatus as recited in claim 3, wherein:
   the specular reflected spatial light pattern comprises parallel lines extending in the second direction; and
   the at least one spatial distinction comprises the second direction being different than the first direction.

5. The time-of-flight camera apparatus as recited in claim 4, wherein the processing unit is configured to distinguish the directly reflected spatial light pattern from the specular reflected spatial light pattern by applying at least one directional filter.

6. The time-of-flight camera apparatus as recited in claim 5, wherein the at least one directional filter includes at least two directional filters, the at least two directional filters including a high-pass filter and a low pass filter.

7. The time-of-flight camera apparatus as recited in claim 1, wherein the at least one spatial light pattern is a pattern of dots.

8. The time-of-flight camera apparatus as recited in claim 7, wherein a dot detection or intensity thresholding algorithm is applied to the data.

9. The time-of-flight camera apparatus as recited in claim 7, wherein a comparison to a known spatial relationship between dots in the directly reflected spatial light is used to isolate directly reflected spatial light from specular reflected spatial light.

10. The time-of-flight camera apparatus as recited in claim 1, wherein the at least one spatial distinction used to isolate directly reflected spatial light from specular reflected spatial light is a relative time-of-flight.

11. The time-of-flight camera apparatus as recited in claim 1, wherein the time-of-flight camera utilizes a processing algorithm to distinguish between the at least one spatial light pattern and a set of affine transformations of the at least one spatial light pattern.

12. The time-of-flight camera apparatus as recited in claim 1, wherein the time-of-flight camera apparatus comprises a Lidar.

13. A computer system for facilitating removal of specular reflection noise from light data, comprising:
   one or more processors; and
   one or more computer-readable media having stored thereon executable instructions that when executed by the one or more processors configure the computer system to perform at least the following:
      illuminate, using an illumination unit, a target with a light source, wherein the illumination unit is configured to project light with a spatial light pattern onto the target, wherein the spatial light pattern comprises a pattern that is oriented according to a known direction;
      acquire, with a sensor unit, light data that is reflected from the target, wherein the light data comprises:
         time-of-flight data for light that illuminated the target,
         a directly reflected spatial light pattern that comprises light oriented in a first direction that corresponds to the known direction, and a specular reflected spatial light pattern that comprises light oriented in a second direction that is different from the first direction, and
         the difference between the first direction and the second direction comprises at least one spatial distinction that distinguishes the directly reflected spatial light pattern from the specular reflected spatial light pattern;
      generate specular-reflection-compensated light data by processing, with the one or more processors, the light data, wherein the processing unit is configured to distinguish the directly reflected spatial light pattern from the specular reflected spatial light pattern based upon the at least one spatial distinction; and
      determine, with the one or more processors and based upon the specular-reflection-compensated light data, one or more distances that extend between the light source and one or more portions of the target.

14. The computer system as recited in claim 13, wherein the spatial light pattern corresponds with the directly reflected spatial light pattern.

15. The computer system as recited in claim 13, wherein the directly reflected spatial light pattern comprises parallel lines extending in the first direction.

16. The computer system as recited in claim 15, wherein:
the specular reflected spatial light pattern comprises parallel lines extending in the second direction; and
the at least one spatial distinction comprises the second direction being different than the first direction.

17. The computer system as recited in claim 16, wherein the processing unit is configured to distinguish the directly reflected spatial light pattern from the specular reflected spatial light pattern by applying at least one directional filter.

18. The computer system as recited in claim 13, wherein a processing algorithm is used to distinguish between the spatial light pattern and a set of affine transformations of the spatial light pattern.

19. The computer system as recited in claim 13, wherein the at least one spatial distinction used to isolate directly reflected spatial light from specular reflected light is a relative time-of-flight.

20. A method, implemented at a computer system that includes one or more processors, for facilitating removal of specular reflection noise from light data, the method comprising:

illuminating, using an illumination unit, a target with a light source, wherein the illumination unit is configured to project light with a spatial light pattern onto the target, wherein the spatial light pattern comprises a pattern that is oriented according to a known direction;
acquiring, with a sensor unit, light data that is reflected from the target, wherein:
the light data comprises a directly reflected spatial light pattern oriented in a first direction that corresponds to the known direction, and a specular reflected spatial light pattern oriented in a second direction that is different from the first direction, and
the difference between the first direction and the second direction comprises at least one spatial distinction that distinguishes the directly reflected spatial light pattern from the specular reflected spatial light pattern; and
processing, with a processing unit, the light data, wherein the processing unit is configured to distinguish the directly reflected spatial light pattern from the specular reflected spatial light pattern based upon the at least one spatial distinction.

* * * * *